(12) United States Patent
Shimomura

(10) Patent No.: US 6,888,622 B2
(45) Date of Patent: May 3, 2005

(54) METHOD FOR DETERMINING OBJECT TYPE OF REFLECTIVE OBJECT ON TRACK

(75) Inventor: Noriko Shimomura, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 11 days.

(21) Appl. No.: 10/356,578

(22) Filed: Feb. 3, 2003

(65) Prior Publication Data

US 2003/0174054 A1 Sep. 18, 2003

(30) Foreign Application Priority Data

Mar. 12, 2002 (JP) .................................... P2002-066875
Mar. 25, 2002 (JP) .................................... P2002-083738

(51) Int. Cl.⁷ .............................. G01C 3/08; G01P 3/36; G01B 11/26; B60T 7/16
(52) U.S. Cl. ..................... 356/4.01; 356/28; 356/141.1; 342/70; 342/114; 180/169
(58) Field of Search .......................... 356/141.1, 4.01, 356/28; 342/70, 114; 180/169

(56) References Cited

U.S. PATENT DOCUMENTS

| 5,087,969 | A | * | 2/1992 | Kamada et al. ............. 348/119 |
| 5,166,681 | A | * | 11/1992 | Bottesch et al. ............ 340/933 |
| 5,343,206 | A | * | 8/1994 | Ansaldi et al. ............... 342/70 |
| 5,461,357 | A | * | 10/1995 | Yoshioka et al. ........... 340/435 |
| 5,587,929 | A | * | 12/1996 | League et al. .............. 342/159 |
| 6,055,042 | A | * | 4/2000 | Sarangapani ............... 356/4.01 |
| 6,061,001 | A | * | 5/2000 | Sugimoto .................... 340/903 |
| 6,198,426 | B1 | * | 3/2001 | Tamatsu et al. .............. 342/70 |
| 6,246,949 | B1 | * | 6/2001 | Shirai et al. .................. 701/96 |

FOREIGN PATENT DOCUMENTS

| JP | 06-150195 | 5/1994 |
| JP | 6195600 | 7/1994 |
| JP | 07-270536 | 10/1995 |
| JP | 07-318652 | 12/1995 |
| JP | 10-11580 | 1/1998 |
| JP | 11-45396 | 2/1999 |
| JP | 2000-003499 | 1/2000 |
| JP | 2000-132799 | 5/2000 |
| JP | 2001-256600 | 9/2001 |
| JP | 2002122669 | 4/2002 |
| JP | 2002122670 | 4/2002 |

* cited by examiner

*Primary Examiner*—Stephen C. Buczinski
(74) *Attorney, Agent, or Firm*—McDermott Will & Emery LLP

(57) ABSTRACT

A plurality of reflective points in front of one's vehicle in a traveling direction are detected by a radar device. The plurality of detected reflective points are grouped based on a predetermined standard, and the grouped reflective points are regarded as detection objects. Relative speeds of the detected detection objects are measured with respect to one's vehicle. Types of the detection objects are determined based on the measured relative speeds.

11 Claims, 33 Drawing Sheets

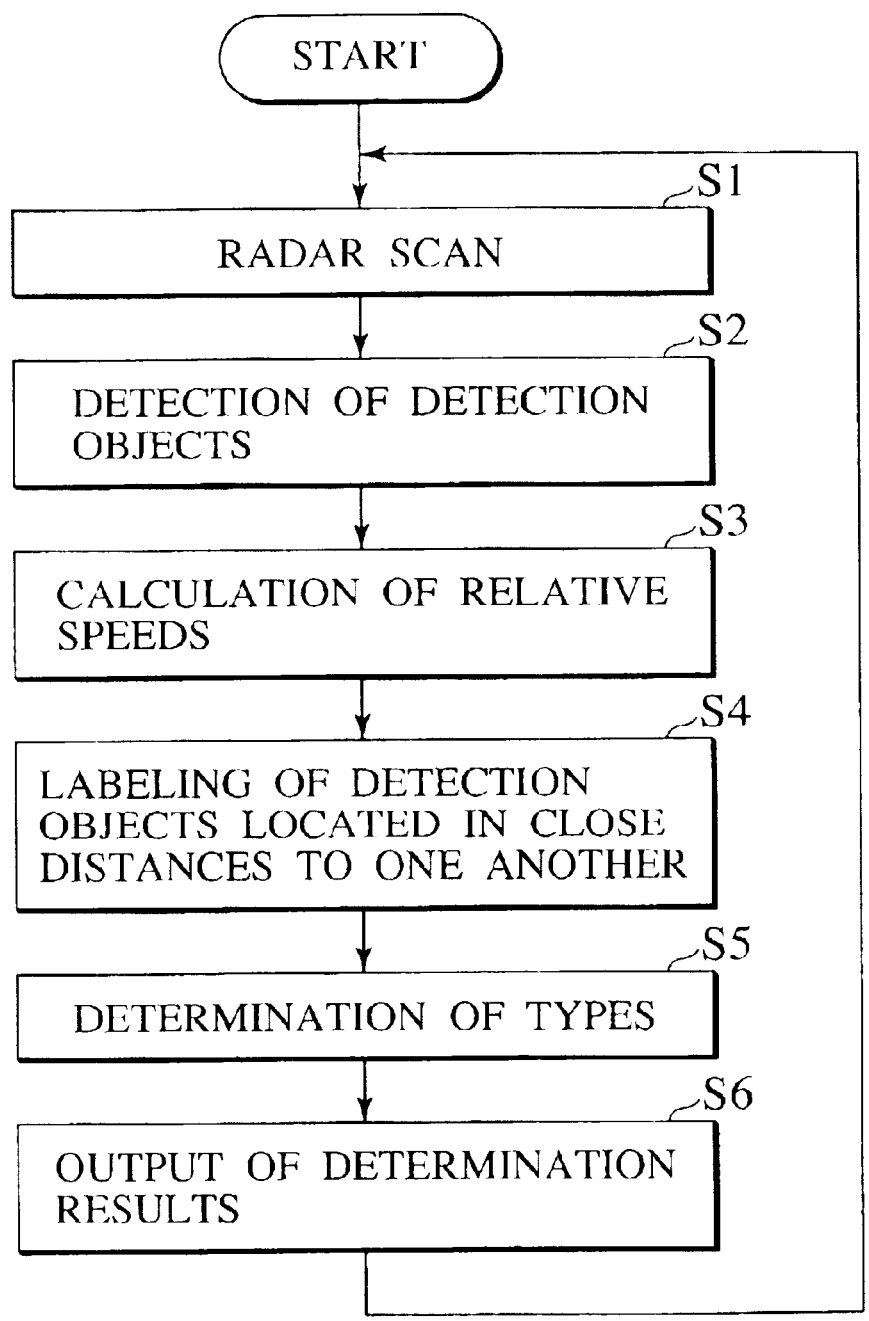

FIG.9

| DETECTION OBJECT | z COORDINATE | x COORDINATE | RELATIVE SPEED | LABEL | TYPE |
|---|---|---|---|---|---|
| A3 | Za | Xa | Va | — | VEHICLE |
| B3 | Zb | Xb | Vb | 1 | VEHICLE |
| C3 | Zc | Xc | Vc | 1 | VEHICLE |
| D3 | Zd | Xd | Vd | 1 | VEHICLE |
| E3 | Ze | Xe | — | 2 | ROAD SIGN |
| F3 | Zf | Xf | — | 2 | ROAD SIGN |
| G3 | Zg | Xg | Vg | — | ROAD SIGN |
| H3 | Zh | Xh | Vh | — | ROAD SIGN |
| I | — | — | — | — | — |
| J | — | — | — | — | — |
| K | — | — | — | — | — |

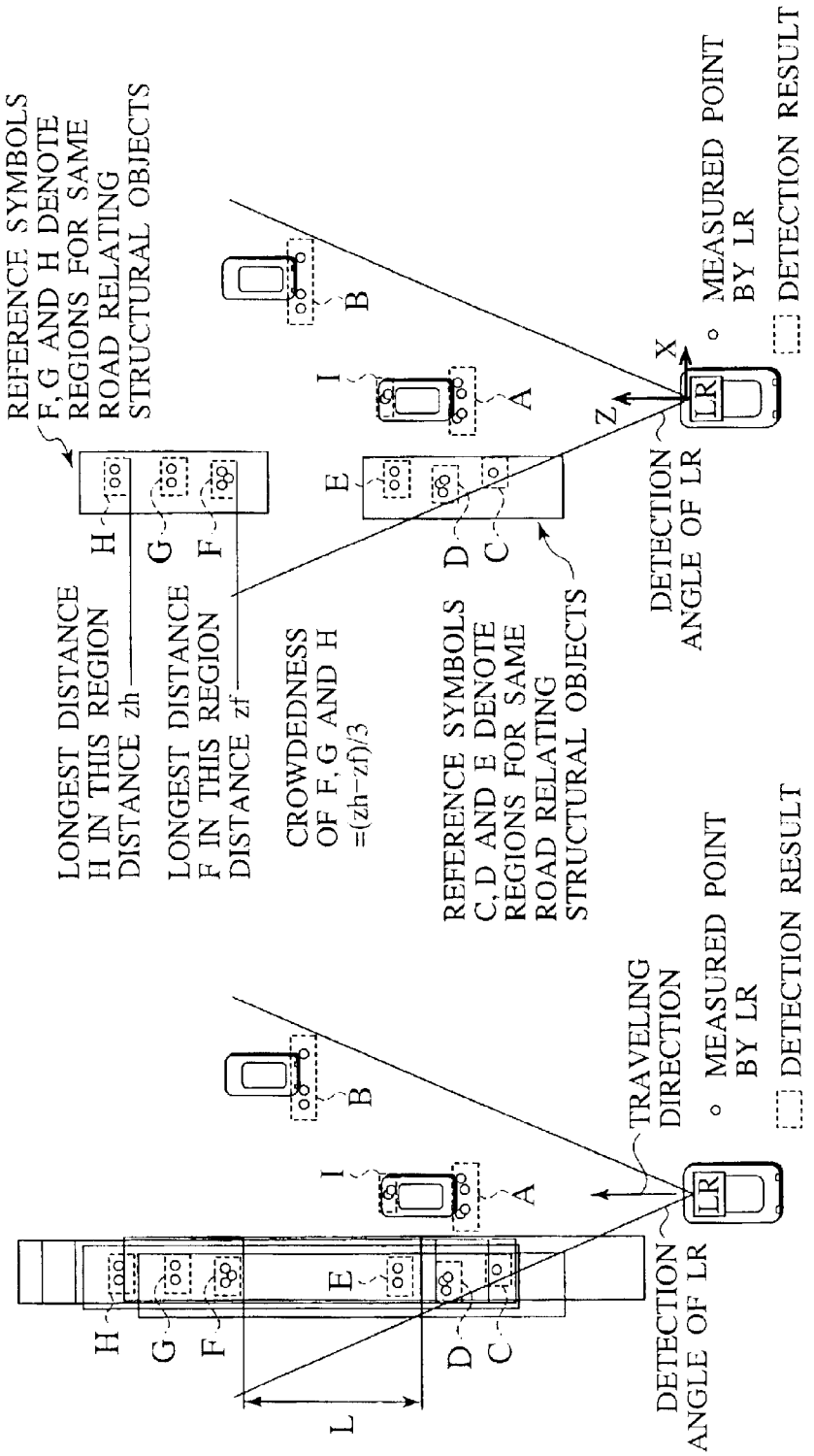

CORRESPONDENCE BETWEEN MOTIONS
AT TIME t - Δt and TIME t

FIG.28

| NAME OF OBJECT | DISTANCE | LATERAL POSITION | RELATIVE SPEED | CROWDED REGION | TYPE |
|---|---|---|---|---|---|
| A | Za | Xa | Va | — | VEHICLE |
| B | Zb | Xb | Vb | — | VEHICLE |
| C | Zc | Xc | Vc | 1 | ROAD RELATING STRUCTURAL OBJECT |
| D | Zd | Xd | Vd | 1 | ROAD RELATING STRUCTURAL OBJECT |
| E | Ze | Xe | Ve | 1 | ROAD RELATING STRUCTURAL OBJECT |
| F | Zf | Xf | Vf | 2 | ROAD RELATING STRUCTURAL OBJECT |
| G | Zg | Xg | Vg | 2 | ROAD RELATING STRUCTURAL OBJECT |
| H | Zh | Xh | Vh | 2 | ROAD RELATING STRUCTURAL OBJECT |
| I | Zi | Xi | Vi | — | VEHICLE |
| J | — | — | — | — | — |
| K | — | — | — | — | — |

METHOD FOR DETERMINING OBJECT TYPE OF REFLECTIVE OBJECT ON TRACK

BACKGROUND OF THE INVENTION

1. Field of the Invention

The present invention relates to a method for determining an object type of a reflective object on a track, which determines whether an object existing in front of a vehicle is a road relating structural object or a running object thereon.

2. Description of the Related Art

As a method for determining a type of an object existing in front of one's vehicle, for example, an object type determining method described in Japanese Patent Application Laid-Open Publication H11-45396 (published in 1999) has been known.

In this object type determining method, the front of one's vehicle is scanned plural times for each predetermined time by a scanning laser radar mounted on one's vehicle to detect the object existing in front of one's vehicle. Then, relative speeds of the object with respect to one's vehicle and a change thereof are measured by utilizing a fact that the detected positions of the object are varied for different scannings. Thus, the type of the object is determined based on the measurement results.

SUMMARY OF THE INVENTION

Here, if a plurality of objects are detected at a narrow interval, then a determination cannot be made at which detected position each of these objects is detected for each scanning, and the relative speeds of these objects cannot be measured accordingly. In this case, these objects are determined entirely to be road signs.

In this determining method, if the plurality of objects are detected at a narrow interval, then the entire objects are determined to be road signs. Therefore, a problem is inherent, that there is a possibility of undesirably determining these objects to be road signs when these objects are provided on a vehicle (for example, when a plurality of objects (such as indicators) are provided on a side surface of a large-sized vehicle such as a trailer).

The present invention was made in order to solve the problem as described above. It is a purpose of the present invention to provide an object type determining method for a reflective object on a track, which is capable of determining a type of an object in front of one's vehicle.

In order to achieve the foregoing purpose, the present invention provides a method for determining an object type of a reflective object on a track, the method including a reflective point detecting step of detecting a plurality of reflective points in front of one's vehicle in a traveling direction, a first detecting step of grouping the plurality of reflective points detected in the reflective point detecting step by a predetermined standard and of regarding the grouped reflective points as a detection object, a relative speed measuring step of measuring a relative speed of the detection object detected in the first detecting step with respect to one's vehicle, and a first determining step of determining a type of the detection object based on the relative speed detected in the relative speed measuring step.

BRIEF DESCRIPTION OF THE DRAWINGS

FIG. 2A is a side cross-sectional view schematically showing the mounting position of the scanning laser radar on the vehicle; and FIG. 2B is a plan view schematically showing the mounting position of the scanning laser radar on the vehicle.

FIG. 3 is a flowchart showing a flow of processing in an object type determining method.

FIG. 4A is a plan view schematically showing a state of detecting the detection objects; and FIG. 4B is a plan view schematically showing detection objects having given the same labels, which are coupled to one another.

FIG. 5A is a plan view schematically showing a state of detecting detection objects at a certain time; FIG. 5B is a plan view schematically showing a state of detecting detection objects at a time after the certain time by a certain period of time; and FIG. 5C is a plan view schematically showing superposed FIGS. 5A and 5B.

FIG. 6A is a plan view schematically showing a state of detecting detection objects at a certain time; FIG. 6B is a plan view schematically showing a state of detecting detection objects at a time after the certain time by a certain period of time; and FIG. 6C is a plan view schematically showing superposed FIGS. 6A and 6B.

FIG. 9 is a table showing contents of data stored in a memory of an object type determining apparatus.

FIG. 13A is a plan view schematically showing a state of detecting detection objects at a certain time; and FIG. 13B is a plan view schematically showing a state of detecting detection objects at a time after the certain time by a certain period of time.

FIG. 20A is a partially enlarged view of FIG. 20B.

FIGS. 21A and 21B are explanatory views showing states of setting regions based on crowdedness of objects.

FIG. 28 is an explanatory view showing correspondence data of grouped objects and types thereof.

DETAILED DESCRIPTION OF THE PREFERRED EMBODIMENT

First Embodiment

The first embodiment of the present invention will be described below based on the drawings.

First, the configuration of the object type determining apparatus 1 for implementing the object type determining method for a reflective object on a track according to the present invention will be described based on FIG. 1 and FIGS. 2A and 2B.

Figure 1:
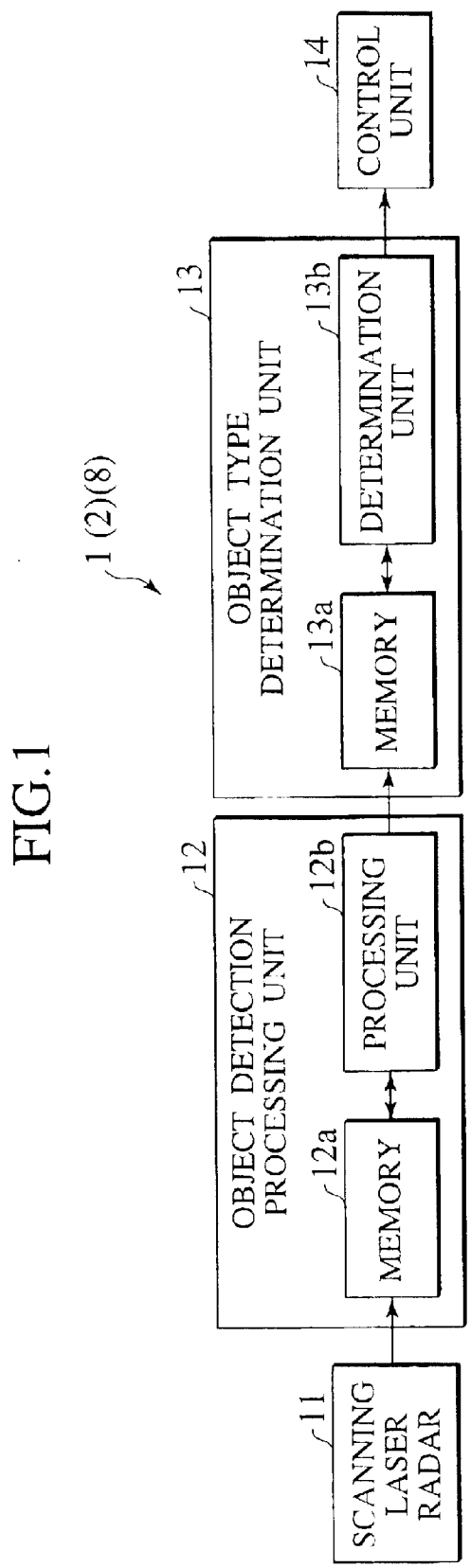
FIG. 1 is a block diagram showing a configuration of an object type determining apparatus.

As shown in FIG. 1, the object type determining apparatus 1 includes the scanning laser radar (detection wave output device) 11, the object detection processing unit 12 for performing predetermined processing based on detection results by the scanning laser radar 11, the object type determination unit 13 for determining a type of an object based on detection results by the object detection processing unit 12, and the control unit 14 for controlling an action of a vehicle based on determination results by the object type determination unit 13.

Figure 2A:
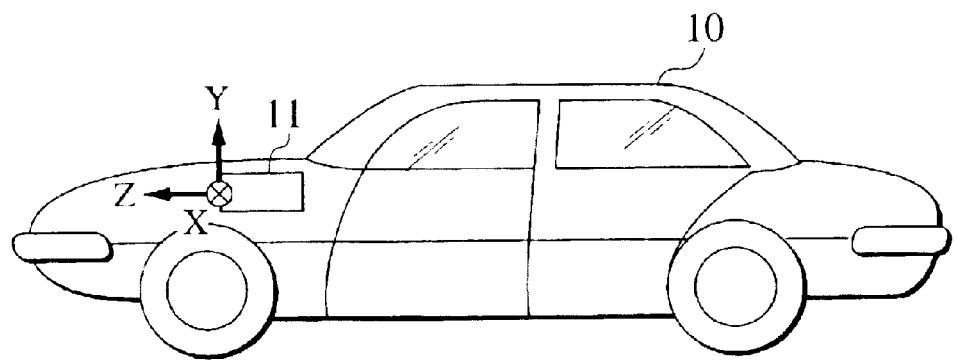
FIGS. 2A and 2B are schematic views showing a mounting position of a scanning laser radar on a vehicle.
Figure 2B:
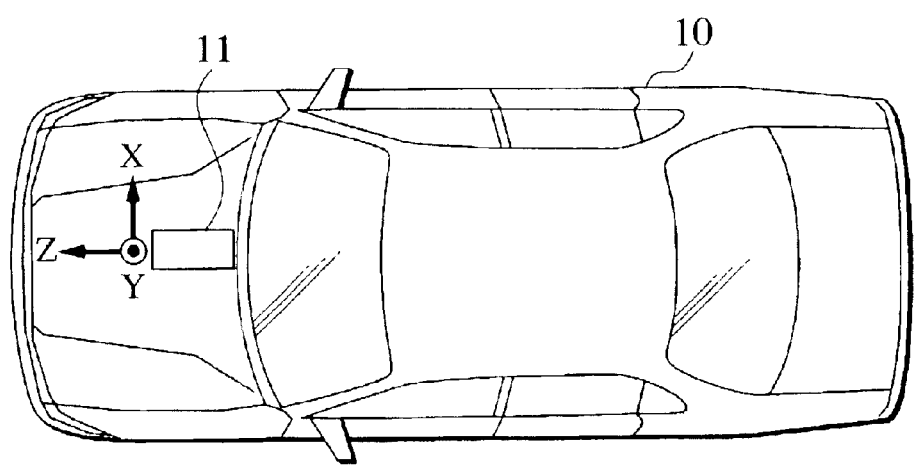

The scanning laser radar 11 is provided in the front portion of one's vehicle 10 as shown in FIGS. 2A and 2B. Then, the scanning laser radar 11 scans the front of one's vehicle one-dimensionally by a laser beam (detection wave) in a direction parallel to a road surface, detects a reflective point that reflects the laser beam, and measures the relative position of the reflective point to one's vehicle, a distance from one's vehicle to the reflective point and the orientation of the reflective point to one's vehicle. Then, the scanning laser radar 11 outputs detection results including the measurement results to the object detection processing unit 12.

The object detection processing unit 12 includes the memory 12a and the processing unit 12b and controls these constituent components.

The memory 12a stores the detection results given from the scanning laser radar 11.

The processing unit 12b acquires the detection results stored in the memory 12a, performs predetermined processing to be described later based on these detection results, and outputs the processing results to the object type determination unit 13.

The object type determination unit 13 includes the memory 13a and the determination unit 13b and controls these constituent components.

The memory 13a stores the processing results given from the processing unit 12b.

The determination unit 13b acquires the processing results from the memory 13a and determines the type of the detection object based on these processing results by a method to be described later. Note that, though the determination unit 13b determines the type of the detection object to be a vehicle or a road sign in this first embodiment and the second to seventh embodiments to be described later, the determination unit 13b may be adapted to be capable of determining the type of the detection object to be another type (for example, a pedestrian moving outside a lane).

FIG. 3 is a flowchart showing the processing procedure of the object type determining method according to the first embodiment. FIGS. 4A and 4B and FIGS. 5A, 5B and 5C are explanatory views of this processing procedure. The operation of the first embodiment will be described below based on these drawings.

Figure 4A:
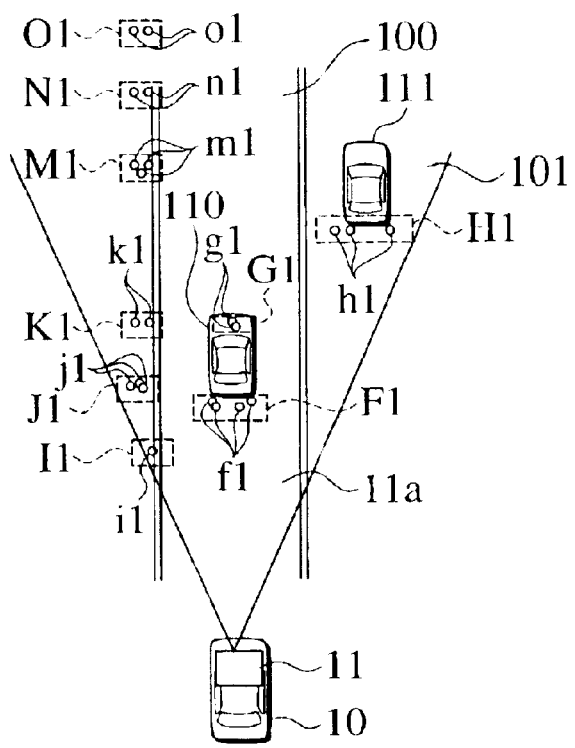
FIGS. 4A and 4B are schematic plan views showing states of detecting detection objects.
Figure 4B:
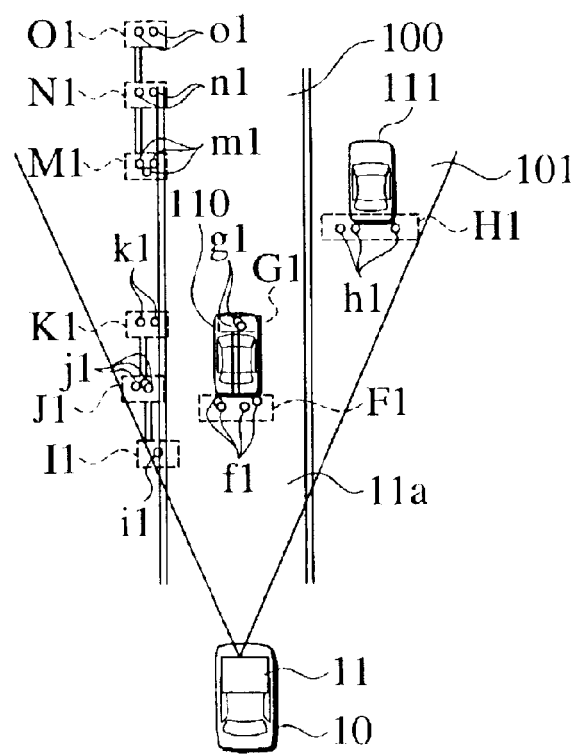

In the first embodiment, as shown in FIGS. 4A and 4B, the object type determining method will be described in the case where one's vehicle 10 runs on the lane 100, the vehicle 110 runs in front of one's vehicle 10 at a substantially equal speed, the vehicle 111 runs on the adjacent lane 101 to the lane 100 at the substantially equal speed, and the plurality of road signs (such as delineators) are installed at a predetermined interval on the left side of the lane 100 seen from one's vehicle 10. Note that this object type determining method can be used for other cases as a matter of course.

In Step S1 shown in FIG. 3, as shown in FIG. 4A, the scanning laser radar 11 scans the region 11a in front of one's vehicle 10 by a laser beam and detects the reflective points f1 . . . , g1 . . . , i1 . . . , j1 . . . , k1 . . . , m1 . . . , n1 . . . , and o1 . . . , which reflect the laser beam.

In Step S2, the scanning laser radar 11 measures the relative positions of the reflective points to one's vehicle 10, the distances from one's vehicle 10 to these reflective points and the orientations of these reflective points to one's vehicle 10 (reflective point detection step). Then, the detection results including these measurement results are stored in the memory 12a.

Here, these reflective points are detected as points on a xyz space defined by setting the position of one's vehicle as an origin, taking a x axis in the direction parallel to the road surface and vertical to the traveling direction of one's vehicle 10, taking a z axis in the traveling direction of one's vehicle 10, and taking a y axis in the direction vertical to the road surface as shown in FIG. 2. The relative positions of the reflective points are measured as the coordinates of the points. The distances from one's vehicle 10 to the reflective points and the orientations of the reflective points to one's vehicle 10 are measured based on these coordinates.

Then, the processing unit 12b acquires the detection results from the memory 12a, and determines reflective points proximal to each other to be reflective points on the same detection object, thus detecting the detection object (first detection step). Specifically, the reflective points f1 . . . are set as reflective points on the detection object F1, and the reflective points g1 . . . are set as reflective points on the detection object G1. Similarly, other reflective points h1 . . . , i1 . . . , j1 . . . , k1 . . . , m1 . . . , n1 . . . and o1 . . . are set as reflective points on the detection objects H1, I1, J1, K1, M1, N1 and O1, respectively. Thus, the detection objects F1 to O1 are detected. Here, it is assumed that intervals among the detection objects I1 to K1 and intervals among the detection objects M1 to O1 are shorter than the first predetermined distance to be described later.

Then, the relative positions of the detection objects to one's vehicle and the sizes thereof are measured (size measurement step). Then, the measurement results are stored in the memory 13a. Note that the detection objects F1 and G1 are actually a group of objects belonging to the same vehicle, that the detection object H1 is actually an object belonging to a vehicle, and that the detection objects I1 to O1 are actually a group of the road signs.

In Step S3, the processing unit 12b measures the relative speeds of the detection objects, and the measurement results of the relative speeds are stored in the memory 13a (relative speed measurement step). Note that FIG. 4B is an explanatory view of the first labeling step, which will be described later.

Next, the measurement method for the relative speeds will be described with reference to FIGS. 5A, 5B and 5C.

Figure 5A:
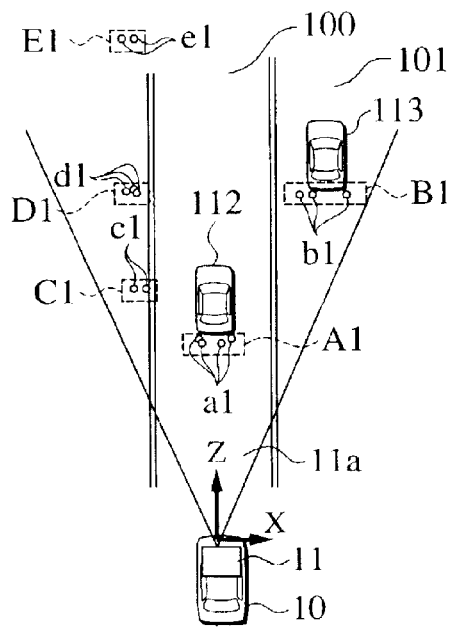
FIGS. 5A, 5B and 5C are schematic plan views showing a method for obtaining a relative speed.

Specifically, the processing of Steps S1 and S2 is carried out at a certain time T1, the reflective points a1 . . . , b1 . . . , c1 . . . , d1 . . . and e1 . . . are detected, and thus the detection objects A1 to E1 are detected (FIG. 5A). Then, the respective sizes of the detection objects A1 to E1 are measured, and the detection results are stored in the memory 12a.

Figure 5B:
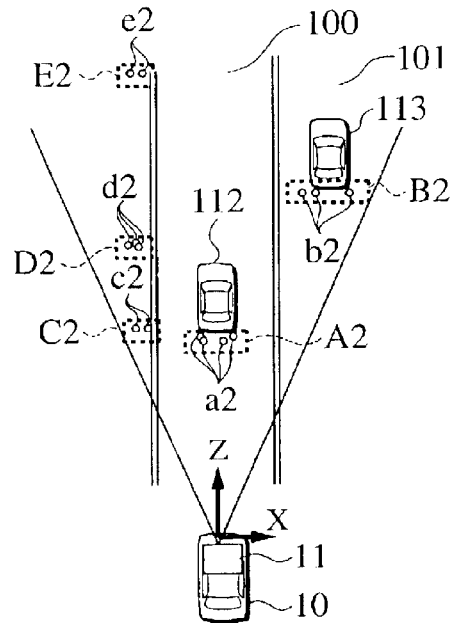
Figure 5C:
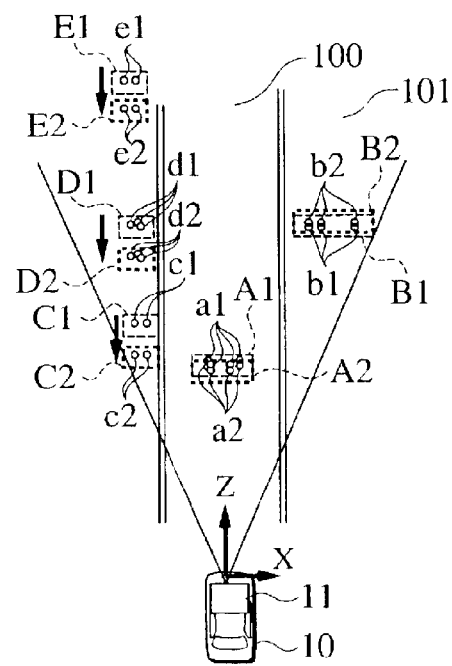

Then, the processing of Steps S1 and S2 is carried out similarly at a time T2 after the time T1 by a predetermined time t, and the reflective points a2 . . . , b2 . . . , c2 . . . , d2 . . . and e2 . . . are detected, and thus the detection objects A2 to E2 are detected (FIG. 5B). Then, the respective sizes of the detection objects A2 to E2 are measured, and the detection results are stored in the memory 12a.

Then, the detection results at the time T1 and the detection results at the time T2 are acquired from the memory 12a. Subsequently, the sizes and relative positions of the respective detection objects, which have been detected at the time T1, and the sizes and relative positions of the respective detection objects, which have been detected at the time T2, are collated (FIG. 5C).

As a result of this, detection objects in which the sizes are approximately the same and the relative position at the time T1 and the relative position at the time T2 are close to each other are regarded as the same. Specifically, the detection objects A1 and A2 are regarded as the same, and similarly, the detection objects B1 and B2, C1 and C2, D1 and D2, and E1 and E2 are regarded as the same, respectively.

Then, if the relative speed of the detection object A1 is measured, then a value obtained by dividing the distance from the relative position of the detection object At to the relative position of the detection object A2 by the time t is defined as the magnitude of the relative speed of the detection object A1, and the direction where the detection object A1 is displaced with respect to one's vehicle 10 from the time T1 to the time T2 is defined as the direction of the relative speed of the detection object A1. This processing is carried out also for the other detection objects, and thus the relative speeds of the respective detection objects are measured.

Figure 6A:
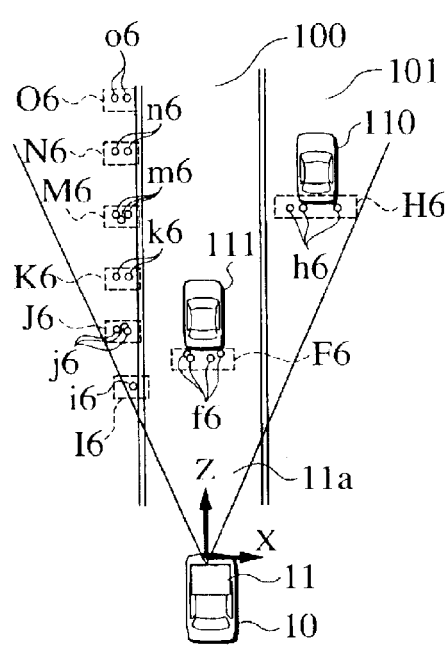
FIGS. 6A, 6B and 6C are schematic plan views showing a case where a relative speed cannot be obtained.
Figure 6B:
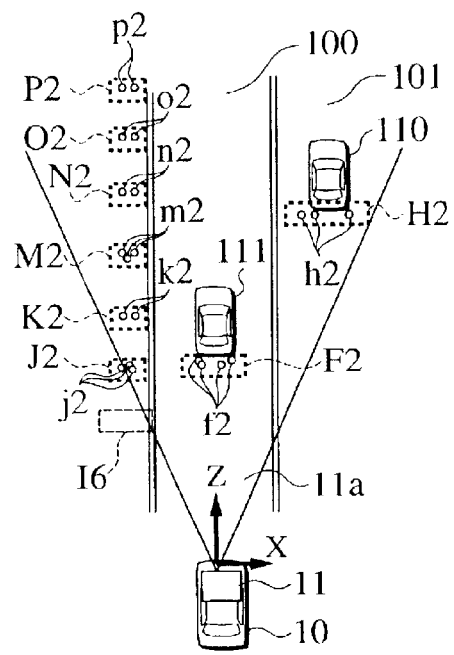
Figure 6C:
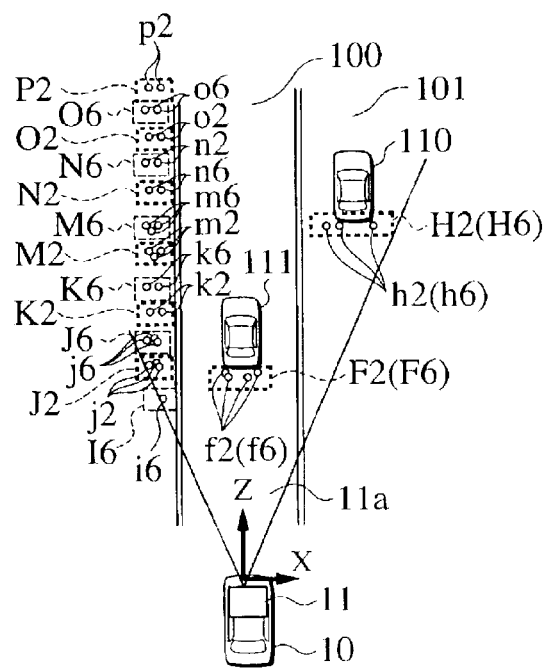

The following should be noted. If the relative speeds of the detection objects I1 to O1 are to be obtained by this method, then the detection objects may sometimes be confused with one another for each scanning, for example, as shown in FIG. 6C because the detection objects I1 to O1 have approximately the same size and are detected at relative positions proximal to one another. Specifically, in the case where the detection objects as shown in FIG. 6A have been obtained at the time T1 and the detection objects as shown in FIG. 6B have been obtained at the time T2, an accurate determination cannot be made at which relative position each of the detection objects I1 to O1 has been detected for each scanning. Therefore, the relative speeds of the detection objects I1 to O1 cannot be measured accurately. Accordingly, the relative speeds of the detection objects I1 to O1 are not measured, but a measurement result to the effect that the relative speeds cannot be measured accurately is stored in the memory 13a. Note that detailed description regarding the case where the relative speeds cannot be measured accurately will be made later.

Meanwhile, though the detection objects F1 and G1 are detected at a narrow interval, the detection objects F1 and G1 are not confused with each other in the measurement of the relative speeds since the sizes thereof are different from each other. Hence, the relative speeds of the detection objects F1 and G1 can be measured accurately.

Moreover, the relative speed of the detection object H1 can be measured accurately since other detection objects are not detected in the vicinity thereof.

Note that the magnitudes of the relative speeds of the detection objects F1 and G1 become substantially zero since the detection objects F1 and G1 are a group of objects belonging to the vehicle 110 running at the same speed as that of one's vehicle 10.

Subsequently, in Step S4 shown in FIG. 3, the processing unit 12b gives the same labels to detection objects located within the first predetermined distance among the detection objects F1 to O1 (first labeling step). The first predetermined distance is set to be a little shorter than a length of a usual vehicle so as not to give the same labels to detection objects detected from two or more vehicles respectively by processing to be described later.

The first labeling step will be described below with reference to FIG. 4B.

Specifically, labels are given to the detection objects by the processing of the processing unit 12b in the following manner. Labels 1 are given to the detection objects I1 to K1 since the detection objects I1 to K1 exist within the first predetermined distance. Labels 2 are given to the detection objects M1 and O1 since the detection objects M1 and O1 exist within the first predetermined distance. Labels 3 are given to the detection objects F1 and G1 since the detection objects F1 and G1 exist within the first predetermined distance. Note that the detection objects being given the same labels are shown in a coupled way in order to indicate correlations between the detection objects which are given the same labels.

Meanwhile, no label is given to the detection object H1 shown in FIG. 4B since another detection object does not exist within the first predetermined distance from the detection object H1.

Then, the labeling results are stored in the memory 13a.

Thereafter, in Step S5, the determination unit 13b acquires the measurement results and the labeling results, and determines the types of the objects based on these results by the following method (first determining step).

Specifically, with regard to the type of the detection object being given no label, the determination unit 13b determines the type of the detection objects based on comparison results obtained by comparing the relative speed of the detection object with the speed of one's vehicle and by comparing the size of the detection object with a predetermined size. The predetermined size is set to be smaller than a detection object measured by the processing unit 12b in the case where the detection object is a part of a usual vehicle (for example, the rear portion of the vehicle), and is set to be larger than a detection object measured by the processing unit 12b in the case where the detection object is a road sign in order to avoid a misdetermination of the detection object that is a part of the vehicle to be the road sign.

For example, in the case where the magnitude of the relative speed of the detection object is substantially the same as the speed of one's vehicle and where the direction of the relative speed is substantially reverse to the direction of the speed of one's vehicle, this detection object can be said to be a static object. Then, if this detection object is larger than the predetermined size, this detection object can be said to be an object belonging to the vehicle (for example, the rear portion of the vehicle). Therefore, the type of this detection object is determined to be an object belonging to a static vehicle. Meanwhile, in the case where this detection object is smaller than the predetermined size, this detection object can be said to be a road sign. Therefore, the type of this detection object is determined to be the road sign.

Meanwhile, if the relative speed of the detection object is a speed other than the above, this detection object can be said to be a moving object. Therefore, the type of this detection object is determined to be an object belonging to a running vehicle. Note that the actual speed of this detection object is measured based on the relative speed and the speed of one's vehicle.

Specifically, the size of the detection object H1 without any label is larger than the predetermined size, and the relative speed thereof is substantially zero. Therefore, this detection object is determined to be an object belonging to a vehicle moving at substantially the same speed as that of one's vehicle 10.

Meanwhile, the type of the detection objects being given the labels is determined based on the labels being given to the detection objects as well as the comparison results regarding the sizes of the detection objects and the relative speeds.

Specifically, the group of the detection objects which is given with the same labels is determined to be a group of objects that belong to the same object and are capable of being regrouped or a group of the same type of objects. Note that the regrouping will be described in the fourth embodiment.

Specifically, the relative speeds of the detection objects I1 to K1 being given the labels 1 (FIGS. 4A and 4B) cannot be measured accurately, and the sizes thereof are smaller than the predetermined size. Therefore, the detection objects I1 to K1 are determined to be a group of the same type of the road signs.

Similarly, the relative speeds of the reflective points included in the detection objects M1 to O1 being given the labels 2 cannot be measured accurately, and the sizes of the detection objects M1 to O1 are smaller than the predetermined size. Therefore, the detection objects M1 to O1 are determined to be a group of the same type of the road signs.

Meanwhile, the relative speeds of the detection objects F1 and G1 being given the labels 3 are substantially zero, and the detection object F1 larger in size than the predetermined size is included in the detection objects F1 and G1 as described later. Therefore, the detection objects F1 and G1 are determined to be a group of objects that belong to the same vehicle and are capable of being regrouped.

In Step S6, the determination unit 13b outputs the determination results to the control unit 14, and the control unit 14 controls one's vehicle 10 to slow down the speed thereof and the like based on the given determination results.

From the above, according to this first embodiment, even in the case where the interval between the detection objects is so narrow and it is difficult to measure the relative speed of each of the detection objects accurately, such as in the case of detecting a plurality of delineators provided at a narrow interval and a plurality of reflectors provided on a side portion of a large-sized truck at a narrow interval, the same labels are given to these detection objects, thus making it possible to determine the type of the detection objects which are given the same labels to be plural portions on the same object or the group of the same type of the objects.

Hence, the type of the detection objects can be determined correctly even if the relative speed of each of the reflective points cannot be measured accurately.

Moreover, though a disadvantage to be described below will occur if it is impossible to measure the relative speeds, such a disadvantage can be avoided according to this embodiment.

First, the case where the relative speed cannot be measured will be described in detail in order to explain what and how the disadvantage is while exemplifying the following case. As shown in FIGS. 6A, 6B and 6C, one's vehicle 10 runs on the lane 100, the vehicle 110 runs in front of one's vehicle 10 at substantially the same speed as that of one's vehicle 10, the vehicle 111 runs on the adjacent lane 101 to the lane 100 at substantially the same speed as that of one's vehicle 10, and the plurality of road signs (such as delineators) are installed on the left side of the lane 100 seen from one's vehicle 10.

Specifically, as shown in FIG. 6A, the processing of Steps S1 and S2 is carried out at a certain time T, the reflective points f6 . . . , h6 . . . , i6 . . . , k6 . . . , m6 . . . , n6 . . . and o6 . . . are detected, and thus the detection objects F6 to O6 are detected. Then, the individual sizes and relative positions of the detection objects F6 to O6 are measured, and the detection results are stored in the memory 12a.

Subsequently, as shown in FIG. 6B, the processing of Steps S1 and S2 is carried out similarly at a time T2 after the time T1 by a predetermined time t, the reflective points f2 . . . , h2 . . . , i2 . . . , k2 . . . , m2 . . . , n2 . . . , o2 and p2 . . . are detected, and thus the detection objects F2 to P2 are detected. Then, the individual sizes and relative positions of the detection objects F2 to P2 are measured, and the detection results are stored in the memory 12a.

As a result of this, the detection objects I6 to O6 are detected at a narrow interval. Therefore, the respective detection objects I6 to O6 detected at the time T1 (FIG. 6A) and the respective detection objects J2 to P2 detected at the time T2 have substantially the same sizes and are detected at the relative positions close to each other (FIG. 6C). The detection objects J2 to O2 are actually the same as the detection objects J1 to O1, and the detection object P2 is newly detected.

Here, as shown in FIG. 6A, the detection object J6 detected at the time T1 is detected behind the detection object I6 seen from one's vehicle 10. However, as shown in FIG. 6B, at the time T2, one's vehicle 10 comes close to the detection object, whereby the detection object I6 goes out of the detection region of the scanning laser radar 11. Therefore, the detection object I6 is not detected then.

If the relative speed of the detection object I6 is to be measured in such a case, then the relative position of the detection object J2 at the time T2 and the relative position of the detection object I6 at the time T1 are very proximal to each other, which would be therefore determined as if they were the same detection object. Also for the other detection objects, for example, it is sometimes determined that the detection object J6 detected at the time T1 and the detection objects K2 detected at the time T2 are the same detection object.

Specifically, an accurate determination cannot be made at which relative positions the detection objects I6 to O6 are detected for each scanning, and therefore, the relative speeds of the detection objects I6 to O6 cannot be measured accurately.

Subsequently, if the relative speeds are measured in this case, then it is sometimes determined that each of the detection objects I6 to O6 is detected at substantially the same relative position at the times T1 and T2 to conclude that the relative speed is substantially the same as that of one's vehicle 10. In this case, a disadvantage occurs, that the detection objects I6 to O6 are misdetermined to be a group of objects moving at the speed equal to that of one's vehicle 10 ahead at the left of one's vehicle 10 though the detection objects I6 to O6 are static road signs actually.

In this connection, in the object type determining method according to the present invention, the same labels are given to the detection objects I1 to O1 in such a case. Then, the type of the detection objects I1 to O1 is determined to be the group of the road signs since the detection objects I1 to O1 are smaller than the predetermined size and the relative speeds thereof cannot be measured accurately. Accordingly, the foregoing disadvantage does not occur.

Second Embodiment

Next, the second embodiment of the present invention will be described.

First, the configuration of the object type determining apparatus 2 in this embodiment will be described with reference to FIG. 1.

As shown in FIG. 1, the object type determining apparatus 2 has the same configuration as that of the object type determining apparatus 1 other than that the determination unit 13b of the object type determining apparatus 1 in the first embodiment is allowed to carry out the following processing as well as the foregoing processing. Hence, only different portions from those of the object type determining apparatus 1 will be described as the description for the respective constituent components of the object type determining apparatus 2, and the same reference symbols as those of the object type determining apparatus 1 are used for the constituent components of the object type determining apparatus 2.

Specifically, the determination unit 13b stores the determination results in the memory 13a after the completion of the processing in Step S5 (FIG. 3) in the first embodiment.

Consequently, correspondence data as shown in FIG. 9 will be stored in the memory 13a at the point of determination time of Step S5 (FIG. 3) in the first embodiment.

Moreover, the processing unit 12b performs relabeling processing to be described later in the case of mutually comparing the labeling results for the detection objects given the same labels, the labeling results having been stored in the memory 13a, when the labeling results are stored in the memory 13a after labeling the detection objects.

Next, an object type determining method using the object type determining apparatus 2 will be described with reference to the flowchart of FIG. 7, the schematic plan view of FIG. 8 and the correspondence data of FIG. 9.

Figure 8:
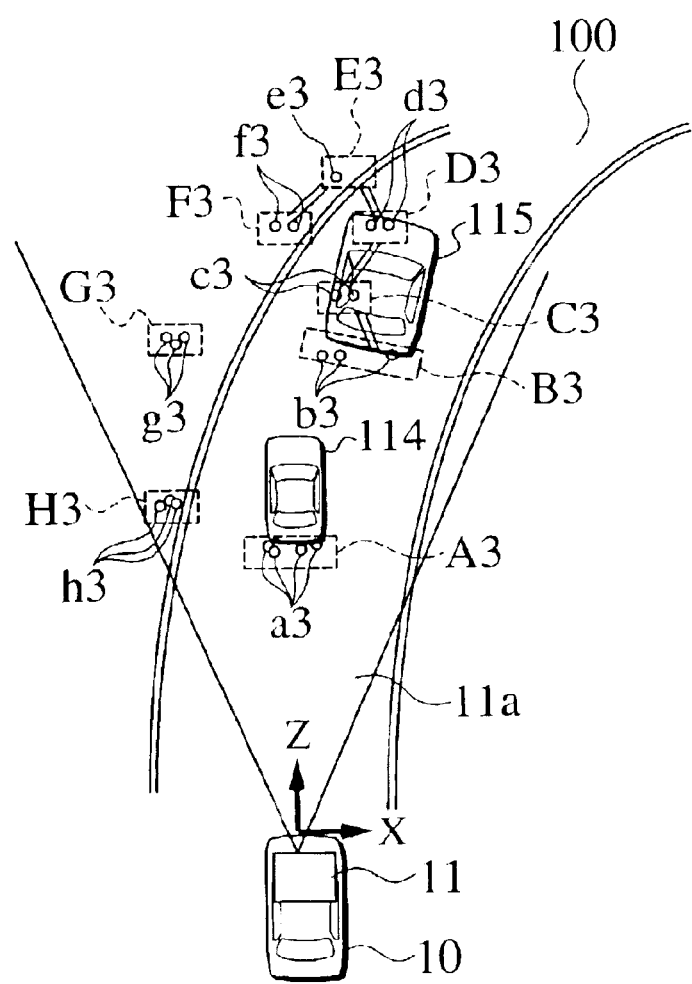
FIG. 8 is a schematic plan view showing a scene where a possibility of being given the same labels to detection objects of different types.

In this embodiment, an object type determining method in the following case as shown in FIG. 8 will be described. In this case, one's vehicle 10 runs on the lane 100, the vehicle 114 runs in front of one's vehicle at substantially the same speed as that of one's vehicle, the vehicle 115 runs along a curve, and a plurality of road signs are provided along the lane 100 on the left side of the lane 100 seen from one's vehicle 10. Note that this object type determining method can be used also in other cases as a matter of course.

Figure 7:
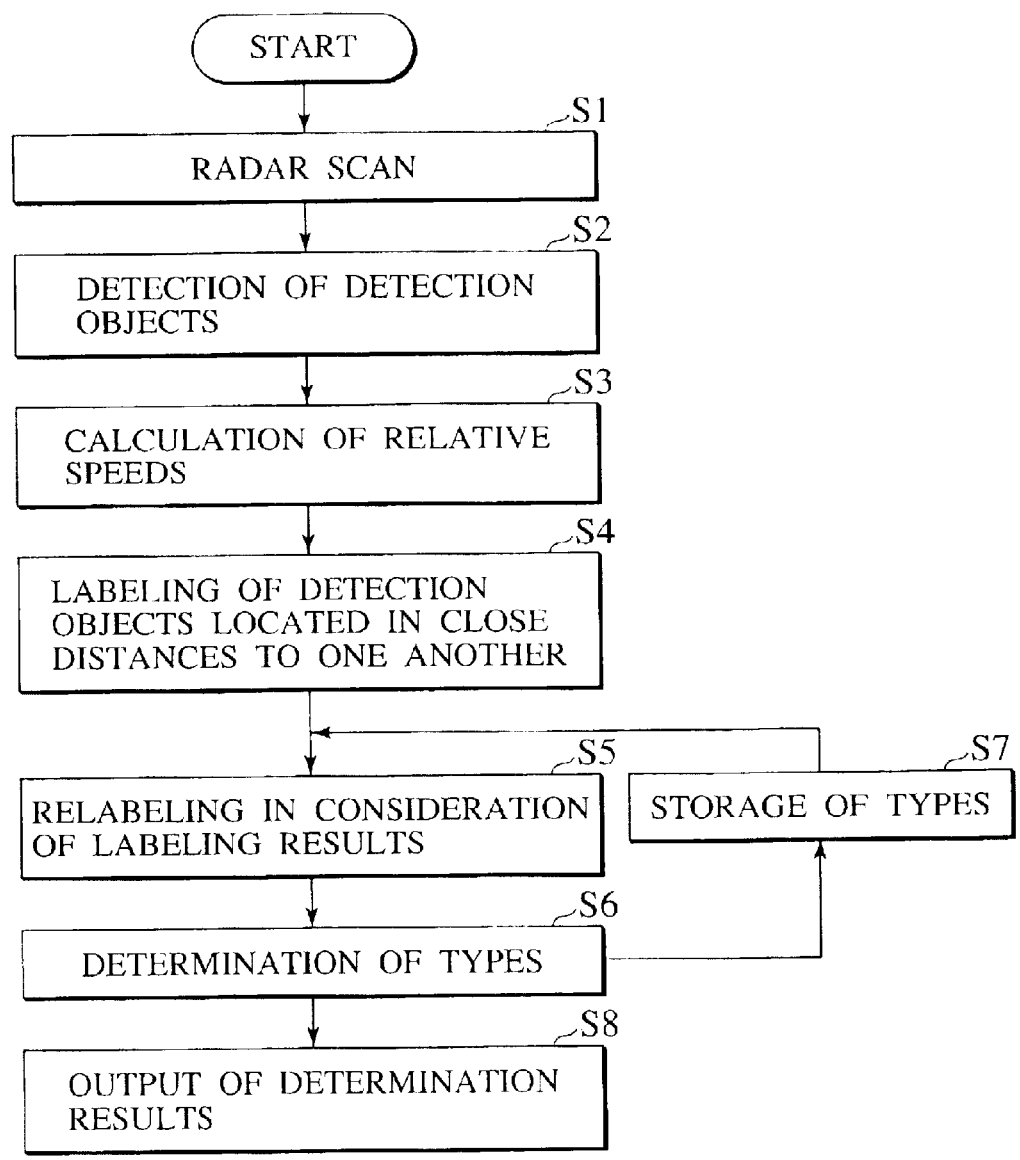
FIG. 7 is a flowchart showing a flow of processing in an object type determining method.

In Steps S1 to S3 shown in FIG. 7, in a state before the case shown in FIG. 8 (a state where the vehicle 115 is apart from the road signs), similarly to the first embodiment, the front of one's vehicle is scanned to detect the reflective points a3 . . . , b3 . . . , c3 . . . , d3 . . . , e3 . . . , f3 . . . , g3 . . . and h3 . . . , and reflective points proximal to one another are determined to be points on the same detection object, and thus the detection objects A3 to H3 are detected. Here, the detection objects E3 to G3 are road signs, the detection object A3 is an object belonging to the vehicle 114, and the detection objects B3 to D3 are groups of objects belonging to the vehicle 115. Moreover, it is assumed that the distance between the detection objects E3 and F3 is shorter than the first predetermine distance.

Then, the relative positions, sizes and relative speeds of the detection objects A3 to H3 are measured.

Here, the relative speeds of the detection objects E3 and F3 are not measured accurately since the detection objects E3 and F3 are detected at a narrow interval similarly to the detection objects I1 to K1 in the first embodiment.

Moreover, the relative speeds of the detection objects B3 to D3 are accurately measured similarly to the detection objects F1 to G1 in the first embodiment.

Moreover, the relative speeds of the detection objects A3, G3 and H3 are accurately measured similarly to the detection object H1 in the first embodiment.

Here, the relative speed of the detection object A3 becomes substantially zero because the detection object A3 is a part of the vehicle 114 running at substantially the same speed at that of one's vehicle 10. Moreover, the magnitudes of the relative speeds of the detection objects G3 and H3 are substantially the same as that of one's vehicle and the directions of the relative speeds become substantially reverse to that of one's vehicle because the detection objects G3 and H3 are road signs as static objects.

Substantially, in Step S4, labels are given to the respective detection objects (first labeling step). Note that the labels are given similarly to the first embodiment at this stage since labeling results are not stored in the memory 13a.

Then, the relative positions, sizes, relative speeds and labeling results of the detection objects A3 to H3 are stored in the memory 13a (data storing step). FIG. 9 shows this result.

Specifically, each of the detection objects A3, G3 and H3 does not have another detection object within the first predetermined distance therefrom, and therefore, the labels are not given thereto. Because the detection objects B3 to D3 exist within the first predetermined distance, the same labels 1 are given thereto. Because the detection objects E3 and F3 exist in the first predetermined distance, the same labels 2 are given thereto.

Note that the plurality of detection objects are detected from the vehicle 115. Such a case can occur when the vehicle 115 is a large-sized vehicle such as a truck. This is because a plurality of objects (for example, reflectors) reflecting a laser beam are provided on the side portions of the large-sized vehicle.

Note that the correspondence data shown in FIG. 9 also has an advantage of usability for comparing the relative positions in calculating the relative speed.

Subsequently, in Step S5 shown in FIG. 7, the processing of Steps S1 and S2 is performed one more time to detect the detection objects A3 to H3 (second detecting step), and the processing of Step S4 is performed one more time to label the detection objects A3 to H3 (second labeling step).

Specifically, the processing unit 12b gives the same labels (for example, the same labels 3) to the detection objects B3 to F3 since the detection objects B3 to F3 exist within the first predetermined distance. Note that FIG. 8 shows the detection objects B3 to F3 in a coupled way in order to clarify the correlations among the detection objects B3 to F3 which are given the same labels.

Thereafter, the processing unit 12b compares the labeling results stored in the memory 13a with one another for the detection objects being given the same labels by the above processing.

Here, a determination for the sameness between the detection objects detected in Step S5 and the detection objects detected in Step S2 is carried out based on the sizes of the detection objects, the relative positions thereof, the labeling results stored in the memory 13a and the types of the labels given to the detection objects in Step S4 as will be described later.

Then, if a determination is made that the labeling results are not entirely the same, then the same labels are given again for each of the detection objects which are given the same labels in Step S4, and the labels given to the detection objects to which the labels are not given in Step S4 are deleted (third labeling step).

Specifically, the processing unit 12b compares the labeling results stored in the memory 13a with one another for the detection objects B3 to F3 which are given the same labels. Consequently, the labeling results are not entirely the same, that is, the same labels 1 are given to the detection objects B3 to D3, and the same labels 2 are given to the detection objects E3 to H3. Therefore, labels different from each other are reallocated to the detection objects B3 to D3 and the detection objects E3 and F3, to all of which the same labels have been given. For example, as a reallocation, the same labels 4 are given to the detection objects B3 to D3, and the same labels 5 are given to the detection objects E3 and F3.

In such a manner, the misdetermination of the determination unit 13b in that the detection objects E3 and F3 are a group of objects belonging to the same object or a group of the same type of the objects can be avoided.

Then, the processing unit 13b stores this labeling result in the memory 13a.

Subsequently, in Step S6 shown in FIG. 7, the determination unit 13b acquires the measurement results and the labeling result from the memory 13a and determines the types of the detection objects based on these results similarly to the first embodiment.

Specifically, the determination unit 13b determines the type of the detection object A3 which the label is not given to be an object belonging to a vehicle running at substantially the same speed as that of one's vehicle because the detection object A3 is larger than the predetermined size and the relative speed thereof is substantially zero.

Moreover, the determination unit 13b determines the respective types of the detection objects G3 and H3 which the labels are not given to be road signs because the detection objects G3 and H3 are smaller than the predetermined size, the magnitudes of the relative speeds thereof are substantially the same as that of the speed of one's vehicle, and the directions of the relative speeds are substantially reverse to the direction of the speed of one's vehicle.

Furthermore, the determination unit 13b determines that the type of the detection objects B3 to D3 being given the same labels is to be a group of objects that belong to one vehicle and are capable of being regrouped, because the detection object B3 larger than the predetermined size is included in the detection objects B3 to D3. Then, the determination unit 13b determines the speed of this vehicle based on the relative speeds of the detection objects B3 to D3 and the speed of one's vehicle 10.

Moreover, the determination unit 13b determines the type of the detection objects E3 and F3 being given the same labels to be a group of the same type of road signs because the detection objects E3 and F3 are smaller than the predetermined size and the relative speed of the detection objects E3 and F3 is not measured accurately.

Subsequently, in Step S7, the determination unit 13b outputs the determination results to the control unit 14 in Step S8 while the determination unit 13b stores the determination results in the memory 13a. Then, the control unit 14 controls one's vehicle 10 to slow down the speed thereof and the like based on the given determination results. Note that FIG. 9 shows the stored results.

From the above, according to this second embodiment, the labeling results stored in the memory 13a are compared with one another for the detection objects being given the same labels after the processing unit 12b labels the detection objects. When it is determined that these labeling results are not entirely the same, the same labels are given again for each of the detection objects being given the same labels in Step S4, and the labels given to the detection objects which the labels are not given in Step S4 are deleted.

In such a manner, even in the case where a large number of detection objects different in type are detected at relative positions proximal to each other and the same labels are given to these detection objects such as a case where a truck passes through the side of a group of delineators, these detection objects can be separated from each other accurately without determining these detection objects to be the same type, and thus can determine the types of the respective detection objects accurately.

Note that the case where the relabeling is necessitated as in FIG. 8 does not occur continuously but can occur only at a moment when the positional relationship as in FIG. 8 is established because the running objects move while the road signs are static. Hence, the types of the objects can be determined accurately even if the relabeling processing is performed based on labeling results by labeling processing performed one time before this processing.

Third Embodiment

Next, the third embodiment will be described.

First, the configuration of the object type determining apparatus 3 in this embodiment will be described with reference to the block diagram of FIG. 10.

Figure 10:
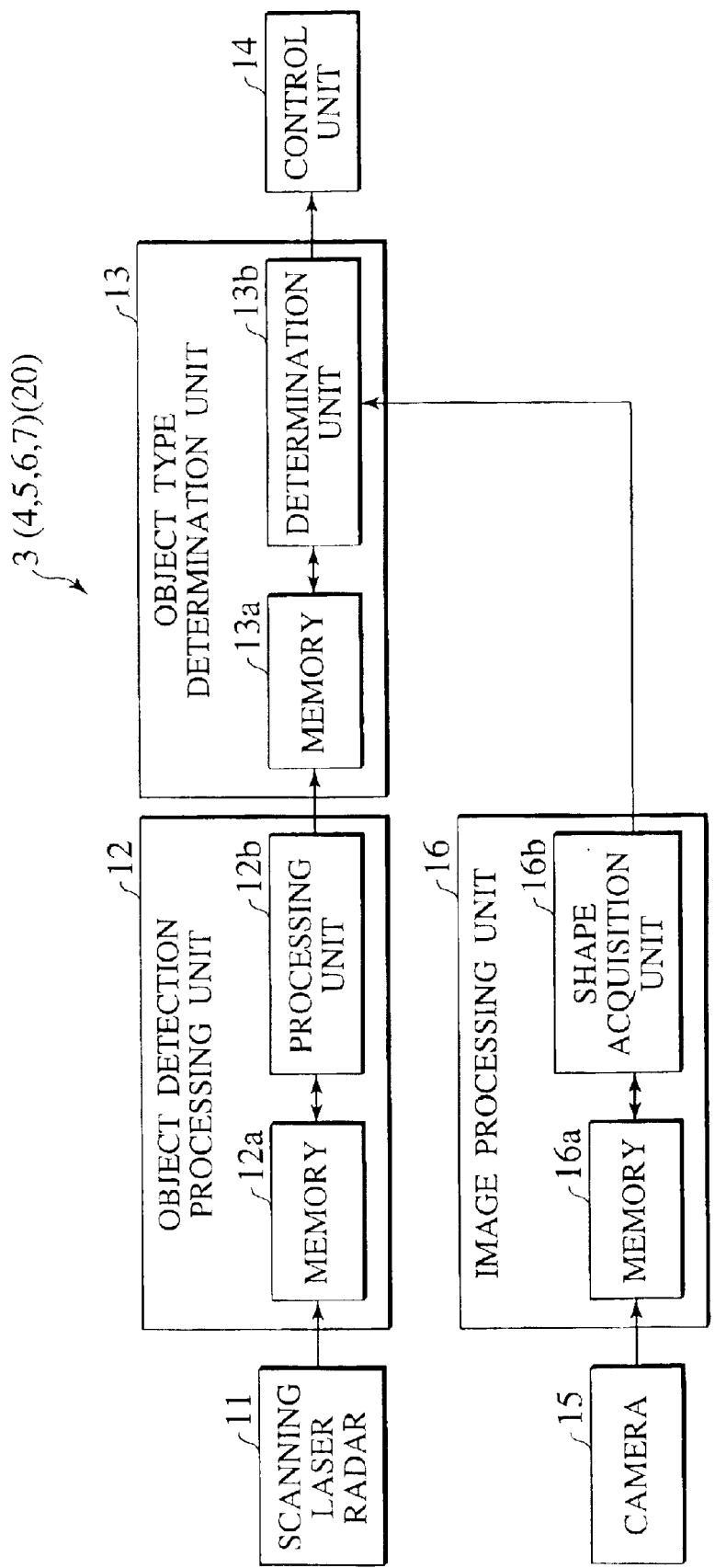
FIG. 10 is a block diagram showing a configuration of the object type determining apparatus.

As shown in FIG. 10, the object type determining apparatus 3 is configured in such a manner that the camera 15 and the image processing unit 16 are added to the object type determining apparatus 2 in the second embodiment. The object type determining apparatus 3 allows the determination unit 13b to perform the following processing besides the above-described processing. Hence, the description for the respective constituent components of the object type determining apparatus 3 will be made only for constituent components different from those of the object type determining apparatus 2, and the same reference symbols as those of the respective constituent components of the object type determining apparatus 2 will be used for the respective constituent components of the object type determining apparatus 2, excluding the camera 15 and the image processing unit 16.

The camera 15 takes photographs of the front of one's vehicle to detect the road shape in front of one's vehicle, and outputs a detection result to the image processing unit 16.

The image processing unit 16 includes the memory 16a and the shape acquisition unit 16b and controls these constituent components.

The memory 16a stores therein the detection result given from the camera 15.

The shape acquisition unit 16b acquires the detection result from the memory 16a, and calculates a shape of a reference line (such as a centerline) provided on the road in front of one's vehicle and calculates the relative position of the line with respect to one's vehicle 10 by a method described in Japanese Patent Laid-Open Publication H10-011580 (published in 1998) and the like, and then outputs a calculation result to the determination unit 13b.

The determination unit 13b determines a type of a detection object by use of the calculation result given from the shape acquisition unit 16b, the labeling result stored in the memory 13a and the like. Note that a determining method will be described later.

Next, the object type determining method using the object type determining apparatus 3 will be described with reference to the flowchart of FIG. 11 and the schematic plan view of FIG. 12.

Figure 12:
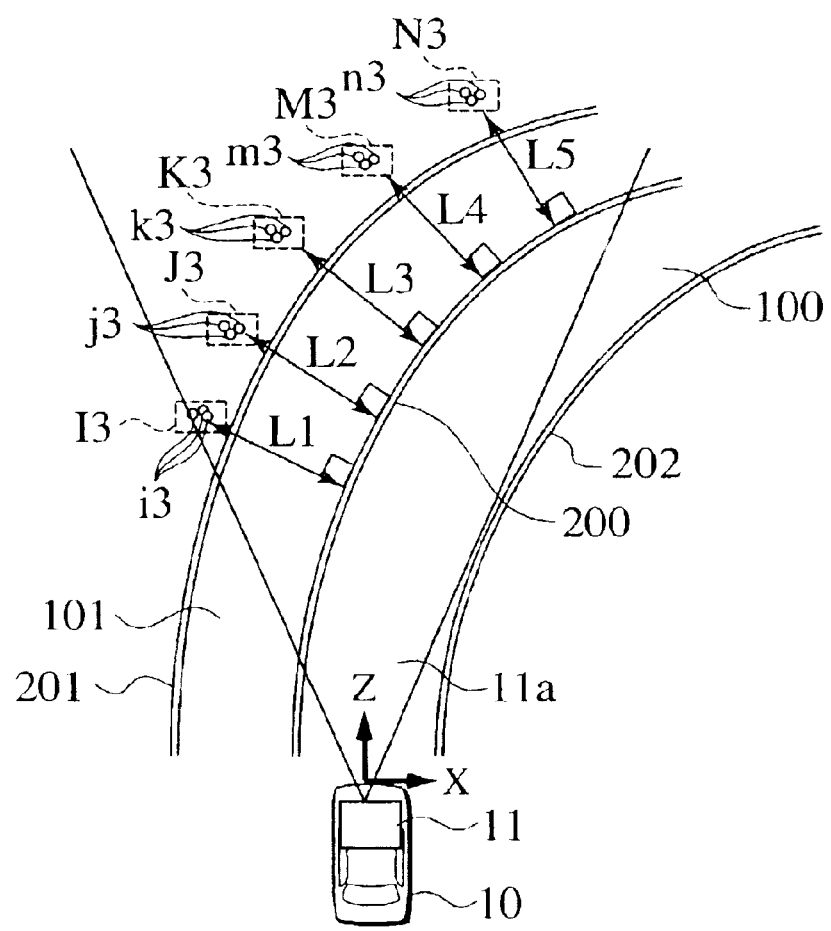
FIG. 12 is a schematic plan view showing a method for measuring a variance value of distances between detection objects as road signs and a reference line.

In this third embodiment, the object type determining method in the following case as shown in FIG. 12 will be described. One's vehicle 10 runs on the lane 100, and the centerline 200 partitioning the lane 100 and the adjacent lane 101 and the boundary lines 201 and 202 partitioning the lanes 100 and 101 and other portions are provided. Moreover, a plurality of road signs are provided at a predetermined interval along the adjacent lane 101 on the left side of the adjacent lane 101 seen from one's vehicle 10. In this case, such a predetermined interval is set to be shorter than the first predetermined distance. Note that this object type determining method can be used in other cases as a matter of course.

Figure 11:
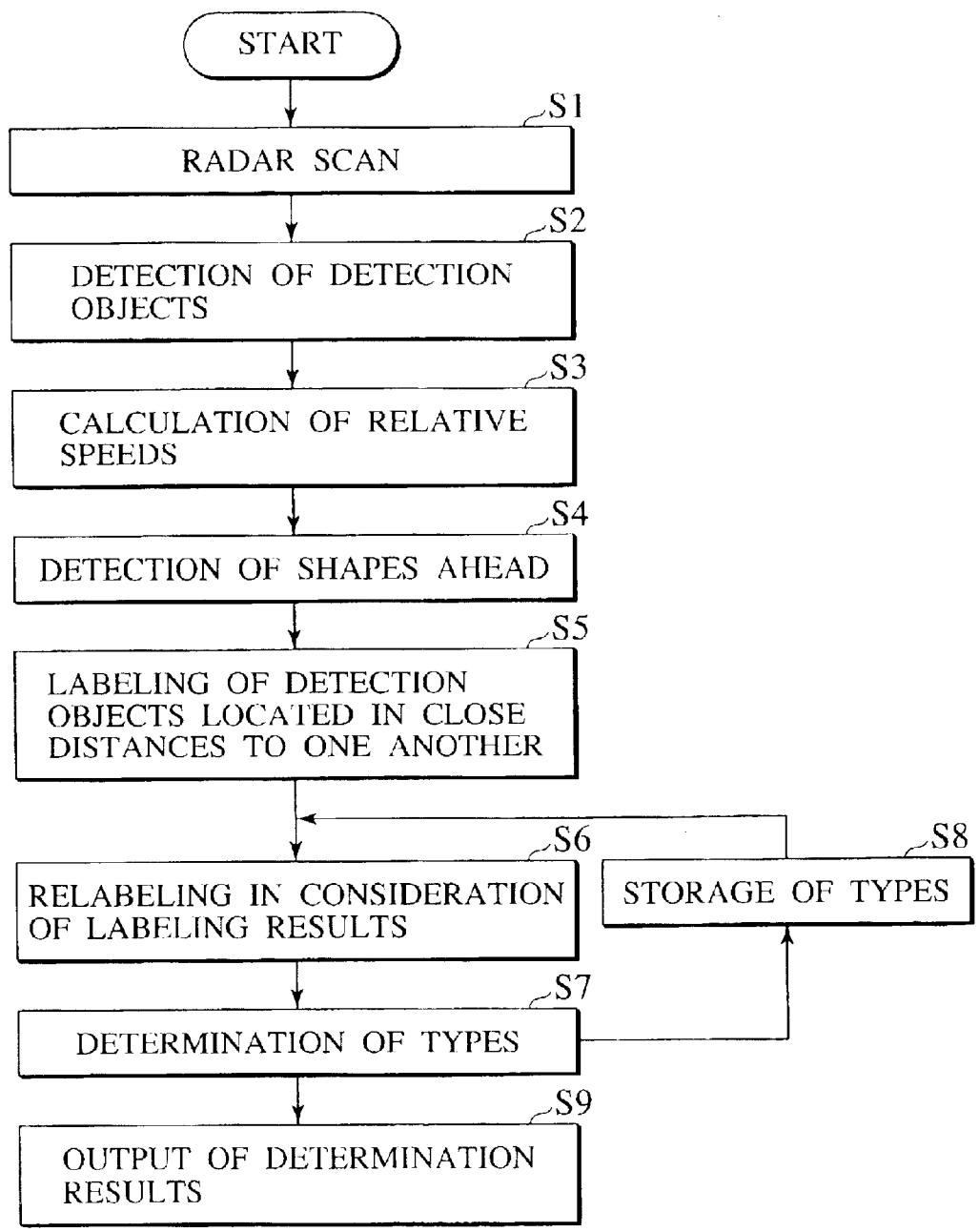
FIG. 11 is a flowchart showing a flow of processing in an object type determining method.

In Steps S1 to S3 shown in FIG. 11, similarly to the first embodiment, the front of one's vehicle is scanned to detect the reflective points i3 . . . , j3 . . . , k3 . . . , m3 . . . and n3 . . . , and reflective points proximal to one another are determined to be points on the same detection object, and thus the detection objects I3 to N3 (which are road signs actually) are detected. Then, the relative positions, sizes and relative speeds of the detection objects I3 to N3 are measured.

Note that the detection objects I3 to N3 are static objects and are detected at the relative positions proximal to one another similarly to the detection objects I1 to O1 in the first embodiment. Therefore, it cannot be determined at which relative positions the detection objects I3 to N3 are detected for each scanning, and the relative speeds thereof cannot be accordingly measured accurately. Hence, information to the effect that the relative speeds cannot be measured accurately is stored in the memory 13a.

In Step S4, the camera 15 takes photographs of the front of one's vehicle, detects the road shape in front of one's vehicle, and stores the detection result in the memory 16a. Then, the shape acquisition unit 16b acquires the detection result from the memory 16a, calculates the shape of the centerline 200 provided on the road in front of one's vehicle and the relative position thereof to one's vehicle 10 (shape detecting step), and outputs the calculation result to the determination unit 13b.

In Step S5, the detection objects are labeled similarly to the first embodiment. The same labels are given to the detection objects I3 to N3 since the detection objects I3 to N3 exist within the first predetermined distance in the case of FIG. 12.

In Step S6, relabeling is performed similarly to the second embodiment in consideration of a labeling result when the labeling result is stored in the memory 13a.

In Step S7, the determination unit 13b obtains the distances L1 to L5 from the respective detection objects I3 to N3 being given the same labels to the centerline 200, and obtains a variance value of these distances. Here, the distances L1 to L5 are defined as lengths of perpendicular lines drawn from the positions of the center points of the respective detection objects to the centerline 200.

Here, the road signs such as delineators are provided for the purpose of indicating the road shape, and therefore, the plurality of road signs are usually provided along the lane on the outside thereof. In other words, the plurality of road signs are provided so that distances from the respective road signs to a reference line on a lane can be approximately equal to one another. Hence, a variance value of these distances is reduced, and therefore, the detection objects I3 to N3 can be said to be a group of road signs if the variance value of the distances from the respective detection objects I3 to N3 to the centerline 200 is smaller than a predetermined value, and otherwise, the detection objects I3 to N3 can be said not to be the group of the road signs.

Then, in the case of FIG. 12, the distances from the respective detection objects I3 to N3 to the centerline 200 are substantially equal to one another because the detection objects I3 to N3 are actually the road signs. Hence, the variance value of the distances is reduced.

Note that, though the above-described distances and variances have been obtained by use of the distances from the centerline 200 to the respective detection objects, the distances and the variances may be obtained by use of distances from another reference line (for example, the boundary line 201, 202 or the like) to the respective detection objects.

Then, the variance value is compared with a predetermined value (which is set larger than a variance value of distances between generally used road signs provided on a road and a reference line). If the variance value is smaller than the predetermined value, then the detection objects I3 to N3 being given the same labels are determined to be road signs. Because the variance value is smaller than the predetermine value in the case of FIG. 12, the detection objects I3 to N3 are determined to be road signs.

In Step S8, the determination result is stored in the memory 13a, 10 and in Step S9, the determination result is outputted to the control unit 14 similarly to the first embodiment.

From the above, according to the third embodiment, the variance value of the distances from the detection objects to the reference line on the lane is compared with the predetermined value, and if the variance value is smaller than the predetermined value, then the set of the detection objects being given the same labels is determined to be the group of the road signs.

Hence, it can be determined more accurately whether or not the type of the detection objects is the road signs.

Note that, in the case of obtaining the variance value of the distances, only detection objects smaller than the predetermined size from among the set of the detection objects being given the same labels are used for calculating the variance value, and a detection object that is larger than the predetermined size and detected at a position out of the array of the road signs (for example, a signboard and the like provided above a road sign) is not used for calculating the variance value. Thus, a more accurate variance value can be calculated.

In such a manner, while the type of the detection objects that have been used for calculating the variance value can be determined to be road signs more accurately, the type of the detection object that has not been used for calculating the variance value can also be determined to be a road relating structural object other than the road signs more accurately.

Fourth Embodiment

Next, the fourth embodiment of the present invention will be described.

First, the configuration of the object type determining apparatus 4 in this embodiment will be described with reference to FIG. 10.

As shown in FIG. 10, the configuration of the object type determining apparatus 4 is the same as that of the object type determining apparatus 3 in the third embodiment except that the processing unit 12b and the determination unit 13b of the object type determining apparatus 3 are allowed to perform the following processing besides the foregoing processing. Hence, the description for the respective constituent components of the object type determining apparatus 4 will be made only for constituent components different from those of the object type determining apparatus 3, and the same reference symbols as those of the respective constituent components of the object type determining apparatus 3 in the third embodiment will be used for the respective constituent components of the object type determining apparatus 4.

Specifically, in the case where a detection object having a determination result (stored in the memory 13a) to the effect that the detection object is a detection object larger than a predetermined size or an object belonging to a vehicle is included in a set of detection objects being given the same labels when the set is detected, the determination unit 13b determines this set of the detection objects to be a group of objects belonging to the same vehicle.

The processing unit 12b determines, to be points on the same vehicle, the entire reflective points which are given the same labels and which type is included in a set of the detection objects determined to be a group of objects belonging to the same vehicle (regrouping).

Next, an object type determining method using the object type determining apparatus 4 will be described with reference to the schematic plan view of FIG. 4.

In this fourth embodiment, the object type determining method in the following case similar to the first embodiment as shown in FIGS. 4A and 4B will be described. One's vehicle 10 runs on the lane 100, the vehicle 110 runs in front of one's vehicle 10 at substantially the same speed at that of one's vehicle 10, and the vehicle 111 runs on the adjacent lane 101 to the lane 100 at substantially the same speed as that of one's vehicle 10. Note that this object type determining method can be used in other cases as a matter of course.

First, as shown in FIG. 4A, similarly to the first embodiment, the detection objects F1 to O1 are detected, and the types of the detection objects F1 to O1 are determined.

Here, the detection objects F1 and H1 to O1 are stably detected since the laser beam of the scanning laser radar 11 reaches the detection objects F1 and H1 to O1 substantially securely.

Hence, the types of the detection objects F1 and H1 to O1 are determined in a method similar to that of the foregoing first or second embodiment, and a determination result is stored in the memory 13a.

Thus, the type of the detection objects I1 to O1 is determined to be road signs, and the types of the detection objects F1 and H1 are determined to be groups of objects belonging to different groups from each other.

Meanwhile, the detection object G1 exists at the deeper position of the detection object F1 seen from one's vehicle 10, and the laser beam of the scanning laser radar 11 may therefore be shielded not to reach the detection object G1 in some cases, thus causing a case where the detection object G1 is not stably detected.

In this connection, the type of the detection object is detected in the following manner.

Specifically, by a method similar to that of the first embodiment, the processing unit 12b measures the relative position, size and relative speed of the detection object G1, gives the same labels to the detection object G1 and the detection object F1 existing within the first predetermined distance from the detection object G1, and stores the processing results in the memory 13a.

Then, the determination unit 13b acquires the determination results and the labeling result from the memory 13a.

Then, it is determined whether or not a detection object having a determination result to the effect that the detection object is larger than the predetermined size or is an object belonging to the vehicle is included in the detection objects F1 and G1 which are given the same labels. Here, the detection object F1 is a part of the vehicle 110, and therefore, the size thereof is larger than the predetermined size, and the detection object F1 has the determination result to the effect that it is an object belonging to the vehicle.

Accordingly, the determination unit 13b determines the detection objects F1 and G1 to be a group of objects belonging to the same vehicle, and stores the determination result in the memory 13a.

Then, the processing unit 12b determines the entire reflective points included in the detection objects F1 and G1 which type is determined to be the group of the objects belonging to the same vehicle to be points on the same vehicle.

From the above, according to this fourth embodiment, if the detection object having the determination result to the effect that the detection object is larger than the predetermined size or is the object belonging to the vehicle is included in the set of the detection objects being given the same labels (for example, the detection objects F1 and G1), then the set of the detection objects is determined to be the group of the objects belonging to the same vehicle.

Hence, it can be determined more accurately whether or not a type of a set of detection objects being given the same labels is a group of objects belonging to the same vehicle even if the set of the objects includes a detection object that is not stably detected.

Moreover, the entire reflective points included in the set of the detection objects having the same labels, which type is determined to be the group of the objects in the same vehicle, are determined to be the points in the same vehicle. Therefore, when the plurality of detection objects are detected from the same vehicle, a misdetermination in that these detection objects are detected from a plurality of vehicles can be securely prevented.

Fifth Embodiment

Next, the fifth embodiment of the present invention will be described.

First, the configuration of the object type determining apparatus 5 in this embodiment will be described with reference to FIG. 10.

As shown in FIG. 10, the configuration of the object type determining apparatus 5 is the same as that of the object type determining apparatus 4 in the fourth embodiment except that the processing unit 12b of the object type determining apparatus 4 is allowed to perform the following processing besides the foregoing processing. Hence, the description for the respective constituent components of the object type determining apparatus 5 will be made only for constituent components different from those of the object type determining apparatus 4, and the same reference symbols as those of the respective constituent components of the object type determining apparatus 4 in the fourth embodiment will be used for the respective constituent components of the object type determining apparatus 5.

When a predetermined number or more of the first detection objects having determination results that they are a group of road signs are detected (though the predetermined number is set at three in this fifth embodiment, the number may be arbitrary), in the case where another detection object exists within the second predetermined distance from any of the first detection objects, which is longer than the first predetermined distance, the processing unit 12b gives the same labels to the first detection objects and the other detection object. It is satisfactory if the foregoing second predetermined distance is set longer than a distance between the first detection objects determined to be road signs, and however, the distance is set approximately two times the distance between the first detection objects in this fifth embodiment.

Next, an object type determining method using the object type determining apparatus 5 will be described with reference to the schematic plan views of FIGS. 13A and 13B.

Figure 13A:
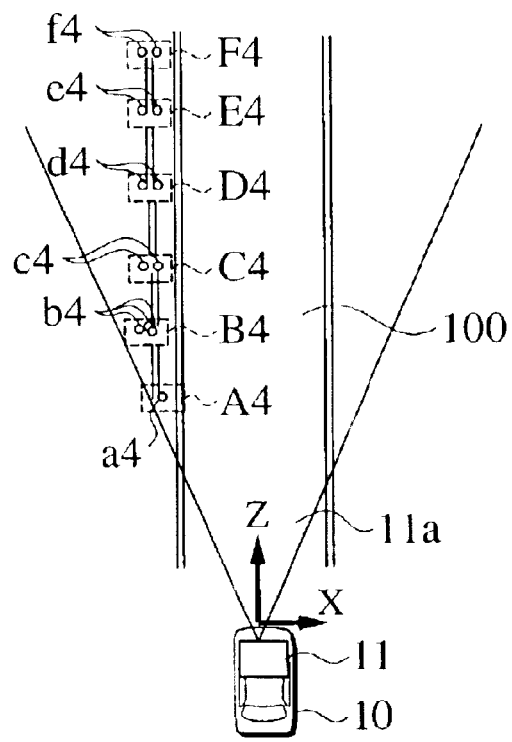
FIGS. 13A and 13B are schematic plan views showing cases where detection objects are not partially detected.
Figure 13B:
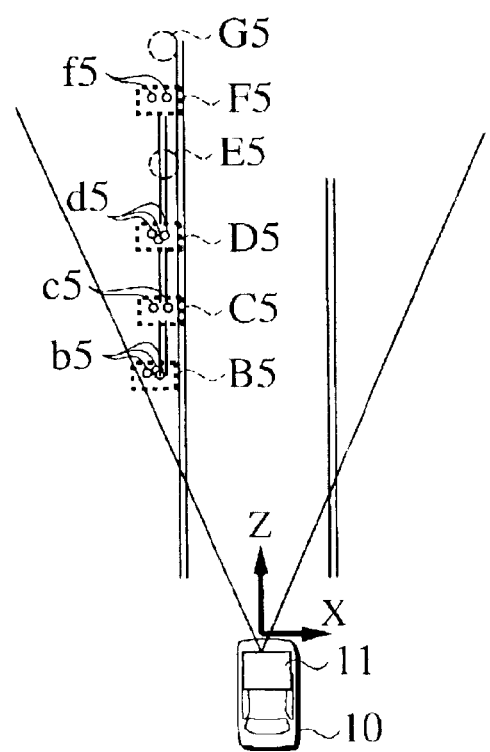

In this fifth embodiment, the object type determining method in the following case as shown in FIGS. 13A and 13B will be described. One's vehicle 10 runs on the lane 100, and a plurality of road sings are provided at a substantially equal interval on the left side of the lane 100 seen from one's vehicle 10. Here, it is assumed that a distance two times or more each interval between the road signs is longer than the first predetermined distance while each interval between the road signs is shorter than the first predetermined distance.

First, as shown in FIG. 13A, similarly to the first embodiment, the scanning laser radar 11 detects the reflective points a4 . . . , b4 . . . , c4 . . . , d4 . . . , e4 . . . and f4 . . . at a certain time T1, and the processing unit 12b determines reflective points proximal to each other to be reflective points on the same detection object, and thus detects the detection objects A4 to F4 and measures the relative positions, sizes and relative speeds of the detection objects A4 to F4. Here, the detection objects A4 to F4 are road signs actually.

Here, the detection objects A4 to F4 exist at narrow intervals, and it cannot be determined at which relative positions the detection objects A4 to F4 are detected for each scanning. Therefore, the processing unit 12b stores information to the effect that the relative speeds of the detection objects A4 to F4 cannot be measured accurately in the memory 13a.

Then, the processing unit 12b determines that the detection objects A4 to F4 mutually exist within the first predetermined distance, gives the same labels to the detection objects A4 to F4, and stores this results in the memory 13a (second data storing step).

Then, the determination unit 13b determines the type of the detection objects A4 to F4 being given the same labels to be a group of road signs and stores the determination result in the memory 13a because the sizes of the detection objects A4 to F4 are smaller than a predetermined size, and the relative speeds are not measured accurately (second data storing step).

Then, when the detection objects are detected at a time T2 after the time T1 by a certain period of time (third detecting step), detection objects to be originally detected may not sometimes be detected as shown in FIG. 5B.

Specifically, the scanning laser radar 11 detects the reflective points b5 . . . , c5 . . . , d5 . . . and f5 . . . , and the processing unit 12b determines the reflective points b5 . . . , c5 . . . , d5 . . . and f5 . . . to be the points on the detection objects B5, C5, D5 and F5, respectively, and thus the detection objects B5 to D5 and F5 are detected. However, in this case, the detection object E5 to correspond to the detection object E4 at the time T1 and the detection object G5 to be detected at the deeper position of the detection object F5 at the time T2 are not detected.

The reason for this is as follows. Specifically, the intensities of the laser beams reflected on the detection objects are usually reduced since the road signs that are the detection objects are usually small, and surfaces thereof are usually dirty. Therefore, the scanning laser radar 11 cannot detect the laser beams in some cases.

Accordingly, the processing unit 12b first acquires the detection results at the time T1 and the detection result at the time T2 from the memory 12a and compares these results with each other. Then, the processing unit 12b determines the detection objects B5 to D5 and the detection objects A4 to D4 to be the same objects because both of them exist at mutually proximal relative positions and the sizes thereof are substantially the same. Then, the processing unit 12b acquires the determination result to the effect that the detection objects A4 to D4 are road signs from the memory 13a, determines the detection objects B5 to D5 to be the road signs based on this determination result, and gives the same labels to the detection objects B5 to D5.

Then, because another detection object does not exist within the first predetermined distance from each of the detection objects B5 to D5 determined to be road signs, the processing unit 12b determines whether or not another detection object exists within the second predetermined distance from any of the detection objects B5 to D5, which is longer than the first predetermined distance, based on the relative positions of the detection objects, which are stored in the memory 13a.

Then, when another detection object exists, the same labels are given to another detection object and each of the detection objects B5 to D5.

Here, because another detection object F5 exists within the second predetermined distance from the detection object D5, the same labels are given to the detection objects B5 to D5 and F5.

Then, the determination unit 13b determines the type of the detection objects B5 to D5 having the determination result to the effect that they are the group of the road signs and the detection object F5 being given the same label to be the road signs.

From the above, according to this fifth embodiment, the same labels can be given to the first detection objects having the determination result to the effect that they are the group of the road signs (for example, detection objects B5 to D5) and to another detection object (for example, detection object F5) existing within the second predetermined distance from any of the first detection objects (for example, detection object D5), which is longer than the first predetermined distance.

Thus, even if the distance from each of a set of the first detection objects that are road signs to another detection object is elongated more than the first predetermined distance, it can be accurately determined whether or not the type of another detection object is a road sign.

Sixth Embodiment

Next, the sixth embodiment of the present invention will be described.

First, the configuration of the object type determining apparatus 6 in this embodiment will be described with reference to FIG. 10.

As shown in FIG. 10, the configuration of the object type determining apparatus 6 is the same as that of the object type determining apparatus 5 in the fifth embodiment except that the processing unit 12b of the object type determining apparatus 5 is allowed to perform the following processing besides the foregoing processing. Hence, the description for the respective constituent components of the object type determining apparatus 6 will be made only for constituent components different from those of the object type determining apparatus 5, and the same reference symbols as those of the respective constituent components of the object type determining apparatus 5 in the fifth embodiment will be used for the respective constituent components of the object type determining apparatus 6.

Specifically, the processing unit 12b acquires the determination results, the labeling results and the like regarding the detection objects from the memory 13a. Then, the processing unit 12b determines whether or not the second detection object determined to be an object belonging to a vehicle exists, and whether or not the third detection object has been detected within the third predetermined distance from the second detection object, which is larger than the first predetermined distance, at the deeper position of the second detection object seen from one's vehicle 10 (scanning laser radar 11). In this case, the foregoing third predetermined distance is set somewhat longer than a length of a usual vehicle.

Then, in the case of detecting the third detection object, the same labels are given to the second and third detection objects. Furthermore, when the fourth detection object exists within the third predetermined distance from any of the second and third detection objects, the same label as that of the second detection object is given to the fourth detection object.

Next, an object type determining method using the object type determining apparatus 6 will be described with reference to the schematic plan view of FIG. 14.

Figure 14:
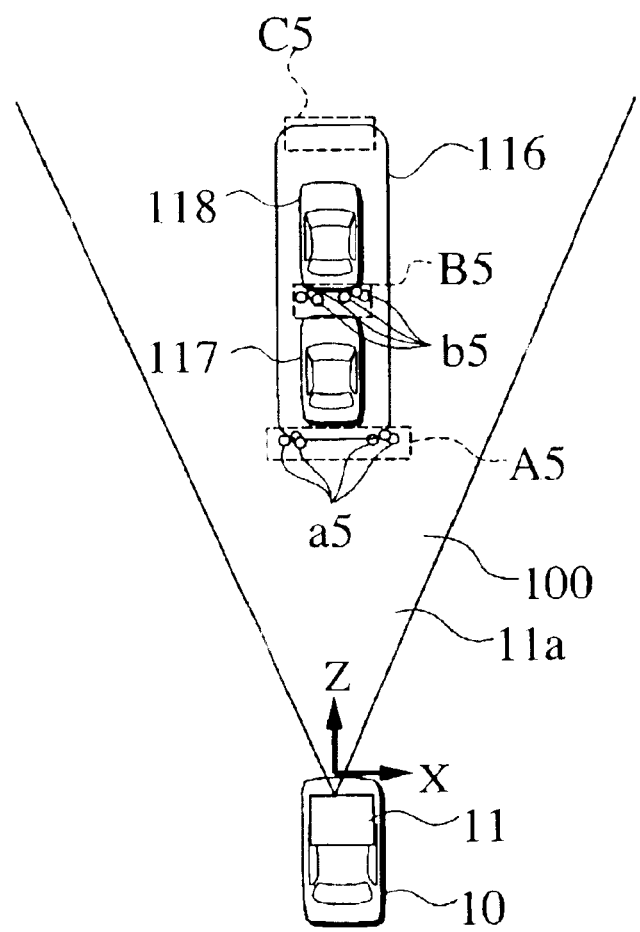
FIG. 14 is a schematic plan view showing a state of detecting detection objects belonging to a large-sized vehicle.

In this sixth embodiment, an object type determining method in the case as shown in FIG. 14 will be described, where one's vehicle 100 runs on the lane 100, and the car transporter (large-sized vehicle) 116 loading therein the vehicles 117 and 118 runs in front of one's vehicle 10 in the same direction as that of one's vehicle 10. Note that this object type determining method can be used for other cases as a matter of course.

Here, in the case of the large-sized vehicle such as a tanker truck and a car transporter carrying automobiles, unlike a usual vehicle, reflections not only from reflectors installed at the rear portion thereof but also from steel plate portions of the tanker truck and reflectors of vehicles mounted on the car transporter are detected. Therefore, as shown in FIG. 14, detection objects exist also at positions to be usually hidden by the rear portion of the large-sized vehicle, seen from one's vehicle 10.

First, as shown in FIG. 3, similarly to the second embodiment, the front of one's vehicle 10 is scanned to detect the reflective points a5 . . . and b5 . . . , which are then determined to be the points on the detection objects A5 and B5, respectively. Thus, the detection objects A5 and B5 are detected. Here, the detection object A5 is detected from the car transporter 116, and the detection object B5 is detected from the vehicle 118. Then, the types of the respective detection objects are determined, and a determination result is stored in the memory 13a.

Consequently, the detection object A5 is determined to be an object belonging to the large-sized vehicle because the detection object A5 is larger than a predetermined size.

Moreover, because the detection object B5 exists within the third predetermined distance, the detection object B5 is given the same label as that of the detection object A5, and the detection objects A5 and B5 are determined to be a group of objects belonging to the same vehicle.

Here, the detection object B5 exists at the deeper position of the detection object A5 seen from one's vehicle 10. Therefore, the same label as those of the detection objects A5 and B5 is given to the fourth detection object when the fourth detection object exists within the third predetermined distance from any of the detection objects AS and B5 being given the same labels. For example, when the fourth detection object C5 is detected from the vicinity of the front at most portion of the car transporter 116, the same label as those of the detection objects A5 and B5 is given to the fourth detection object C5 (first labeling step).

Thus, the determination unit 13b can determine the detection objects A5 to C5 being given the same labels to be plural portions on the same vehicle.

From the above, according to this sixth embodiment, even in the case of detecting the plurality of detection objects belonging to the same large-sized vehicle, these detection objects can be determined accurately to be the group of the objects belonging to the same vehicle without a misdetermination thereof to be groups of objects belonging to different vehicles from each other.

Seventh Embodiment

First, the configuration of the object type determining apparatus 7 in this embodiment will be described with reference to FIG. 10.

As shown in FIG. 10, the configuration of the object type determining apparatus 7 is the same as that of the object type determining apparatus 6 in the sixth embodiment except that the object type determining apparatus 6 is allowed to perform the following processing besides the foregoing processing. Hence, the description for the respective constituent components of the object type determining apparatus 7 will be omitted, and the same reference symbols as those of the respective constituent components of the object type determining apparatus 6 in the sixth embodiment will be used for the respective constituent components of the object type determining apparatus 7.

Specifically, the object type determining apparatus 7 carries out steps up to the first labeling step in the sixth embodiment certain times. In the case of detecting the second and third detection objects of the sixth embodiment in the respective steps, the object type determining apparatus 7 can securely determine the second and third detection objects to be a group of objects on the same large-sized vehicle, and thus determines the types of the second detection object and a detection object being given the same label as that of the second detection object to be the group of the objects belonging to the same large-sized vehicle.

Next, an object type determining method using the object type determining apparatus 7 will be described by use of a similar example to the example of the sixth embodiment as shown in FIG. 14. Note that this object type determining method can be used for other cases as a matter of course.

First, the steps up to the first labeling step in the sixth embodiment is carried out certain times. Consequently, when the detection objects A5 and B5 are detected in the respective steps, the types of the detection object A5 and detection object being given the same label as that of the detection object A5 are determined to be the group of the objects belonging to the same large-sized vehicle.

From the above, according to this seventh embodiment, it can be securely determined whether or not the set of the detection objects is the group of the objects belonging to the large-sized vehicle. Moreover, such determination has an advantage in that, for example, when the vehicle running in front of one's vehicle is a large-sized vehicle, it can also be used for a control of the distance between vehicles in response to a type of an ahead vehicle, which includes a more elongation of a distance between vehicles than the case where the ahead vehicle is a vehicle with a usual size.

Eighth Embodiment

The eighth embodiment of the present invention will be described with reference to the drawings. The object type determining method of this embodiment will be described with reference to FIGS. 1 and 2.

As shown in FIG. 1, the object type determining apparatus 8 to which the object type determining method according to this embodiment is applied includes the scanning laser radar (measurement device) 11 for measuring distance and direction to an object in front thereof (an ahead object) by irradiating a laser beam at the front of one's vehicle and detecting a laser beam reflected on a reflective object in front thereof, the object detection processing unit 12, and the object type determination unit 13.

The object detection processing unit 12 includes the memory 12 for storing therein the data of the distance and direction to an object existing within a scanning angle by the scanning laser radar (hereinafter, simply abbreviated as a "laser radar") 11, and the processing unit 12b for detecting an object existing in front of one's vehicle based on this data.

The object type determination unit 13 determines the type of the ahead object, that is, determines whether the ahead object is a road relating structural object or a vehicle running ahead based on the past determination results of the objects detected in front and a size of a set region (of which detailed contents will be described later).

The eighth embodiment of the present invention will be described below with reference to a flowchart of FIG. 15.

First, the ahead vehicle is detected and a distance (z coordinate) to the ahead vehicle and a lateral position (x coordinate) are measured by use of the laser radar 11. For procedures for detecting a vehicle and calculating a position thereof by using the laser radar 11, an object detection method by grouping of reflective points detected by the scanning laser radar 11 can be applied, for example, as disclosed in Japanese Patent Application Laid-Open Publications 2000-317815, 2000-317821 and the like.

Figure 15:
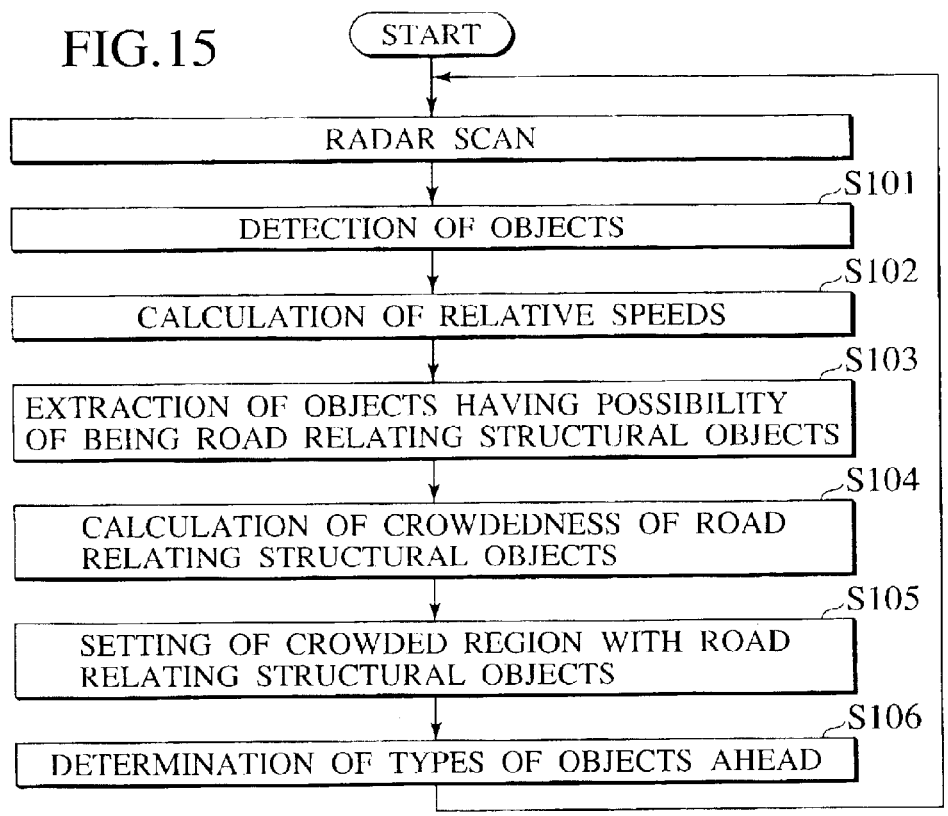
FIG. 15 is a flowchart showing a processing procedure of an object type determining method according to an eighth embodiment.

Specifically, reflective points proximal to one another among the respective reflective points detected by use of the laser radar 11 are grouped, and thus these points are determined to be included in the same object, and the existence of the ahead object is detected (Step S101 in FIG. 15; first detecting step).

Next, the relative speed of the object detected in Step S101 with respect to one's vehicle is obtained (Step S102; relative speed measuring step).

The relative speed can be calculated based on motions of detection points, for example, in the following manner. Every grouping result is stored, and a previous object detection result (time t·Δt) and a current detection result (time t) are collated with each other. Then, objects in which sizes are approximately the same and detection positions are close to each other between the times t and t·Δt are regarded as the same object. Thus, the relative speed is determined based on the motions of these detection positions.

Figure 16:
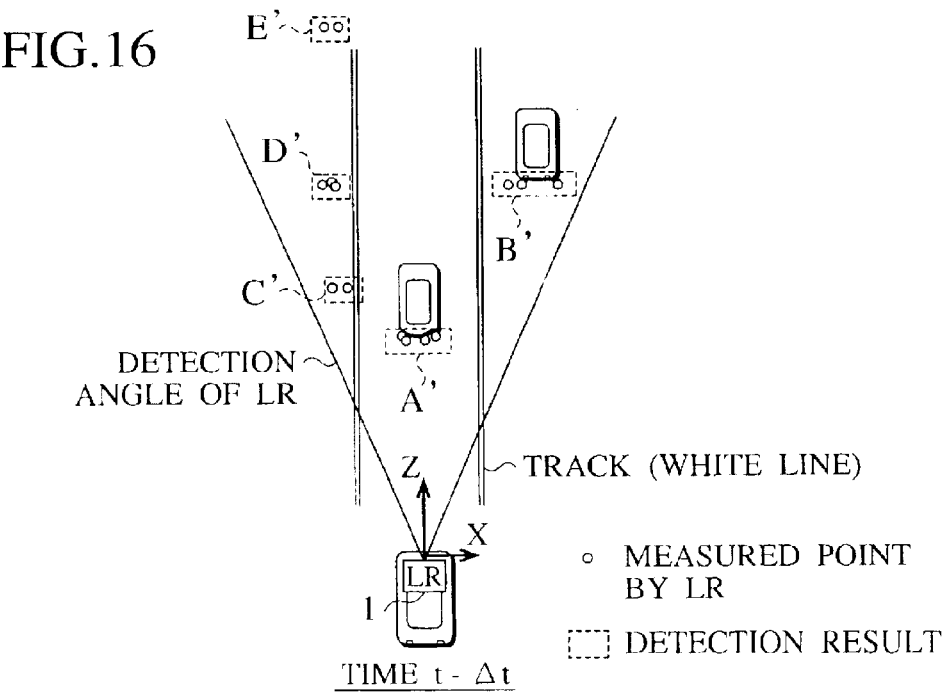
FIG. 16 is an explanatory view showing objects grouped at a time t·Δt.
Figure 17:
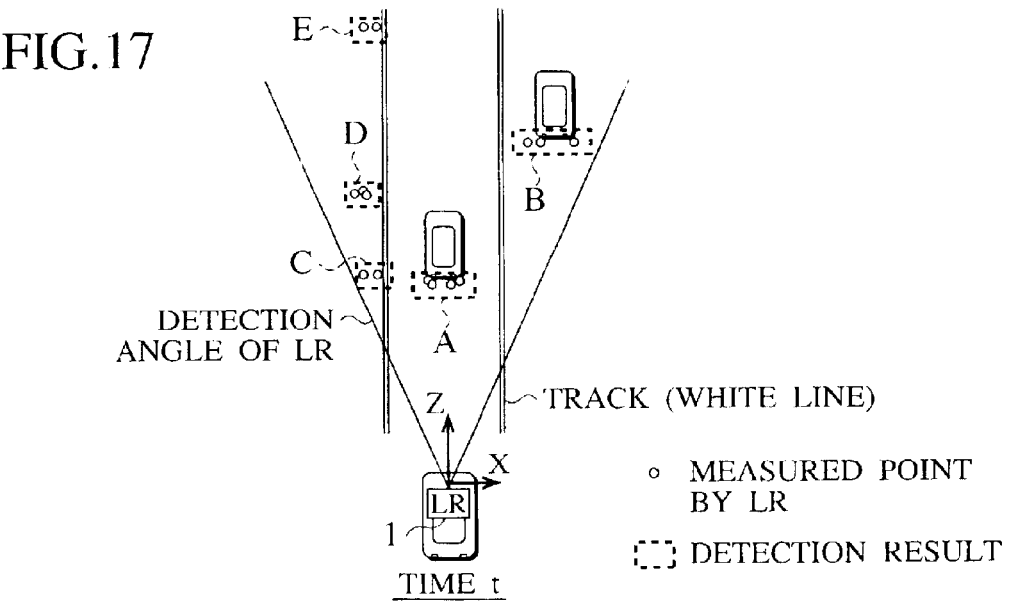
FIG. 17 is an explanatory view showing objects grouped at a time t.
Figure 18:
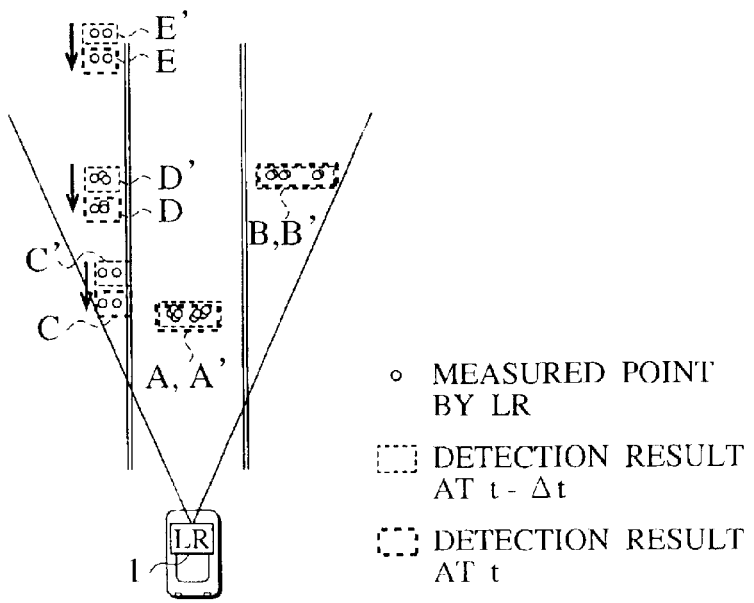
FIG. 18 is an explanatory view showing a state of obtaining relative speeds of the objects from the objects detected at the point of time t·Δt and the objects detected at the point of time t.

FIGS. 16 to 18 are explanatory views showing a procedure for calculating the relative speeds between one's vehicle and the detection objects. FIG. 16 shows reflective points detected at the previous scanning (time t·Δt), and FIG. 17 shows reflective points detected at the current scanning (time t). Moreover, FIG. 18 shows a state of collating the reflective points at the previous time t·Δt and the reflective points at the current time t. From this drawing, it is understood that the object A detected at the time t is the object A' detected at the time t·Δt. Then, the relative speed of this object A can be calculated from a distance change of the time Δt in the formula of $\{zA(t)\cdot zA(t\cdot\Delta t)\}/\Delta t$, where $zA(t)$ is a Z coordinate of the object A at the time t, and $zA(t\cdot\Delta t)$ is a Z coordinate of the object A at the time t·Δt.

Similarly, the relative speeds of the respective objects B' to E' and B to E can be obtained from positional relationships between the objects B' to E' and the objects B to E.

Next, an object having a possibility of being a road relating structural object is selected from objects detected by the grouping (Step S103 in FIG. 15; third determining step).

Here, processing for extracting the object having a possibility of being a road relating structural object is carried out. Therefore, the road relating structural object is not selected, but an object securely determined to be a vehicle is removed, and thus processing for leaving the object having a possibility of being a road relating structural object is carried out.

Here, among the objects detected by the grouping, an object that is detected continuously for a long period of time and stably determined to be a running vehicle, that is, an object that can obviously be assumed to be a vehicle may be determined to be a vehicle. Objects other than the object determined to be a vehicle by this determination are tentatively determined to be objects that may possibly be road relating structural objects at this point of time.

Subsequently, the crowdedness of the road relating structural objects along the depth direction (seen from the vehicle) or the traveling direction of the vehicle is obtained from the positional distribution of the objects that may possibly be the road relating structural objects (Step S104; fourth determining step).

Figure 19:
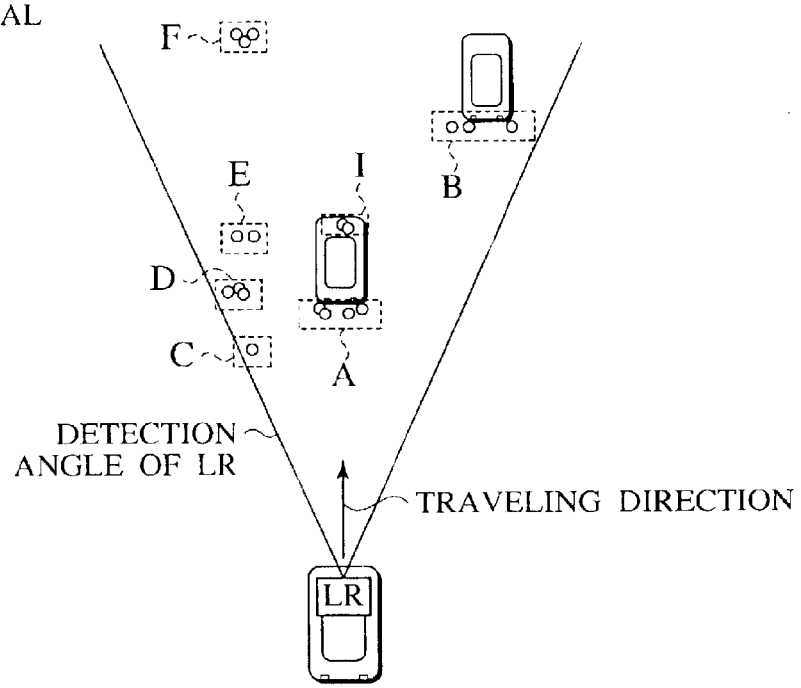
FIG. 19 is an explanatory view showing objects grouped by the scanning laser radar.
Figure 20A:
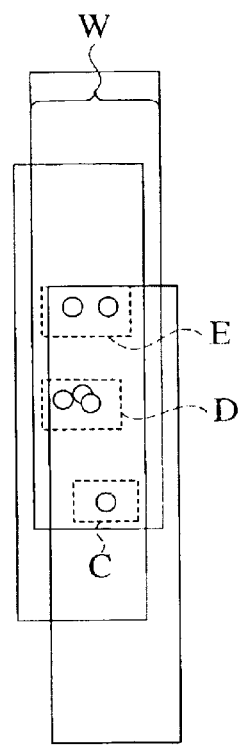
FIGS. 20A and 20B are explanatory views showing processing for determining objects arrayed in a depth direction to be the same object.
Figure 20B:
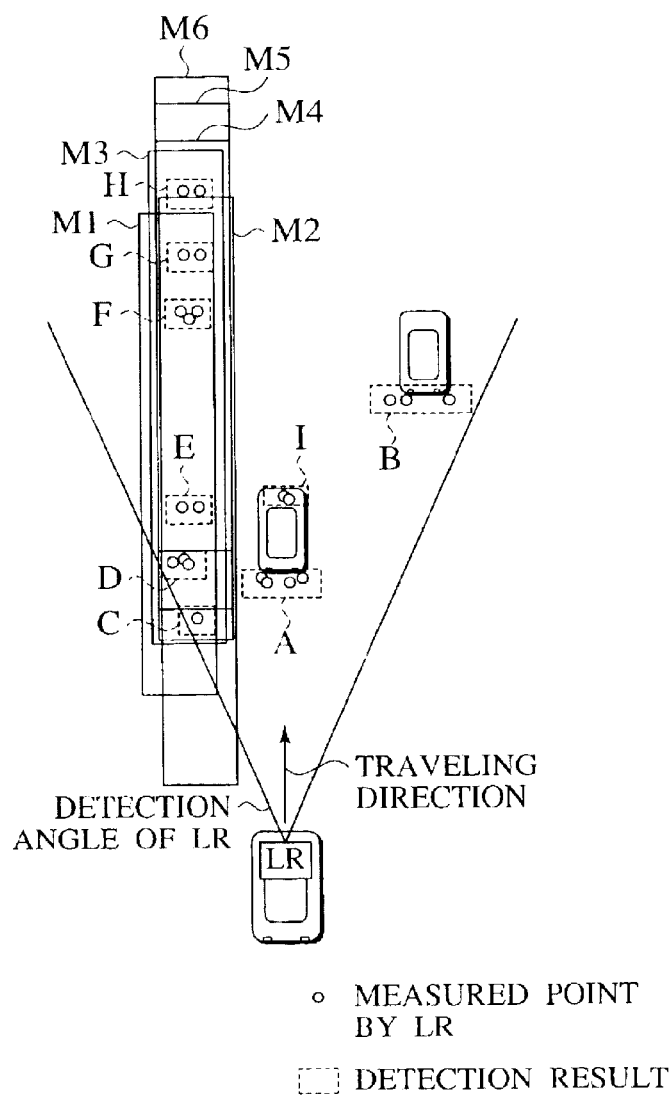

FIGS. 19, 20 and 20A are explanatory views showing an example of a procedure for obtaining the crowdedness of the road relating structural objects. First, the respective objects determined to have a possibility of being the road relating structural objects in the above-described processing are taken as references, and lines with desired lengths, which indicate the depth direction and the traveling direction of the vehicle, are drawn while giving thereto a certain width W (for example, approximately 1 m, which is wider than each object).

Specifically, the lines with the width W in the depth direction are drawn for the six objects C to H determined to have a possibility of being the road relating structural objects, respectively, among the objects A to H as shown in FIG. 19. Consequently, as shown in FIG. 20, the lines M1 to M6 are set for the objects C to H, respectively.

Then, objects belonging to the same array in the depth direction are arranged on the same line (line with the width W), and the objects on this same line are determined to be objects arrayed in the same direction. That is, the objects C to H are determined to be objects arrayed in the same direction.

Next, after the objects are classified into objects for each array made up with the objects in the same direction, the crowdedness of the objects in each array is calculated. The crowdedness can be obtained by the following division for objects determined to exist on the same line and to crowd continuously. A distance difference between an object at the shortest distance (the closest object from one's vehicle; the object C in the example of FIG. 19) and an object at the longest distance (the farthest object from one's vehicle; the object H in the example of FIG. 19) is divided by the number of objects existing therebetween.

However, when a distance difference between objects adjacent to each other is longer than a predetermined value (for example, a vehicle length of a large-sized vehicle) and the interval L is kept long enough between the objects E and F shown in FIG. 21A even if the objects adjacent to each other are on the same line, the region is divided at a point where the interval is kept. Then, as shown in FIG. 21B, the divided regions are recognized as different objects from each other, and the crowdedness of the objects is calculated for each of the regions by a similar procedure to the above-described procedure.

Because one's vehicle goes straight ahead in the example shown in FIGS. 19 to 21B, the depth direction of the objects and the traveling direction of the vehicle coincide with each other. When the track is a curved road, if the traveling direction is calculated from gyrocompass data and a steering angle based on a kinetic equation, then the crowdedness can be calculated by a similar method to the above. Then, when the crowdedness larger than a predetermined value is obtained by this processing, the region is set (Step S105 in FIG. 15; first setting step).

It is satisfactory if the setting of the region is defined as a range made by the objects existing at the shortest and longest distances used for calculating the above-described crowdedness. Consequently, as shown in FIG. 21B, the objects C, D and E will be recognized to be in one region, and the objects F, G and H will be recognized to be in another region.

However, in the region where the crowdedness of the objects is determined to be highs when the distance difference between the object existing at the longest position (farthest position from one's vehicle) and the object at the shortest position (closest position to one's vehicle) is equal to a usual vehicle length or less, and when the width of the object at the shortest distance is approximately equal to a usual vehicle width, then there is a possibility that the objects are not road relating structural objects but the entire objects in that region are reflective points on one vehicle.

Figure 22:
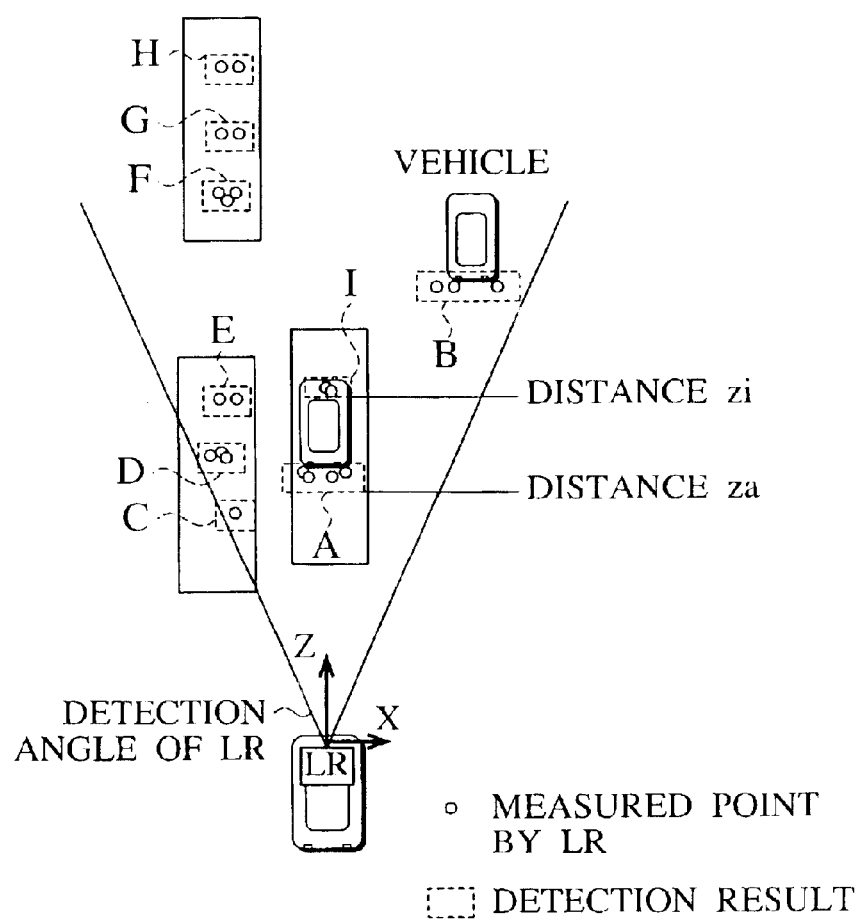
FIG. 22 is an explanatory view showing a state of removing an object determined to be a vehicle among the objects arrayed in the depth direction.

Specifically, for example when the objects A and I shown in FIG. 22 are detected, there is a possibility that these objects belong to a vehicle because an interval therebetween is approximately the vehicle length and the widths of the objects A and I are approximately the vehicle width.

In this case, it is determined whether or not these objects (objects A and I shown in FIG. 22) are objects that were determined to belong to a vehicle in the past based on the past information (information obtained by the previous measurement or before). When the objects were determined to belong to a vehicle in the past, the region thereof is accordingly determined to be a vehicle. Hence, a crowded region of road relating structural objects is not set for this region.

Then, after setting the crowded region of the road relating structural objects by the above-described processing, the types of the objects are determined in consideration of information owned by the objects detected to be in the region and reliability of the information (Step S106).

Processing for determining the types of the detected objects can be carried out, for example, in a procedure described below. First, an object that was securely determined to be a vehicle in the past is determined to be a vehicle as described above. Next, a determining method for remaining objects will be described.

It can be determined whether an object is a usual running object (vehicle) or a stopped object (a road relating structural object) based on the relative speed of the object with respect to one's vehicle. Specifically, if the relative speed is close to the running speed of one's vehicle, then a possibility is high, that the object is a stopped object. If the relative speed is small, then a possibility is high, that the object is a running object (sixth determining step).

Here, in a region where objects having a possibility of being road relating structural objects are crowded, a possibility is high that relative speeds thereof are mismeasured. This case will be described below with reference to the explanatory views shown in FIGS. 23 to 25.

Figure 23:
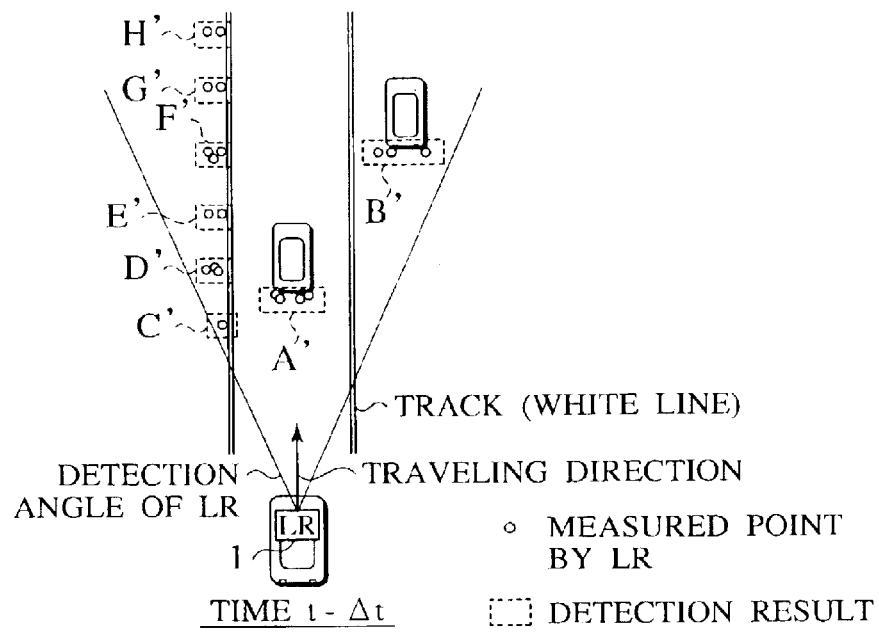
FIG. 23 is an explanatory view showing a state of crowded objects grouped at the time t·Δt.
Figure 24:
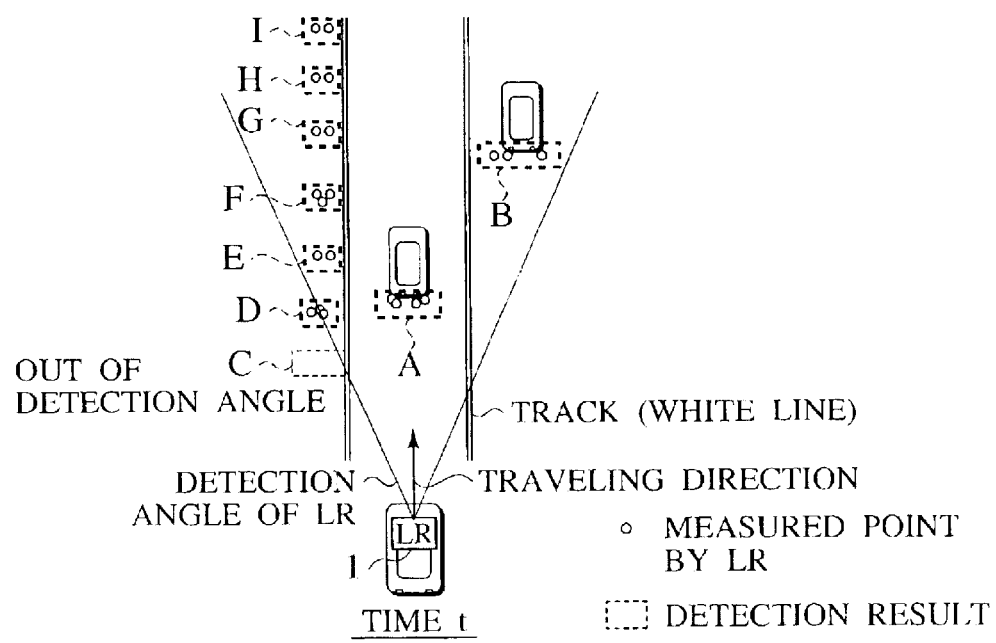
FIG. 24 is an explanatory view showing a state of crowded objects grouped at the time t.
Figure 25:
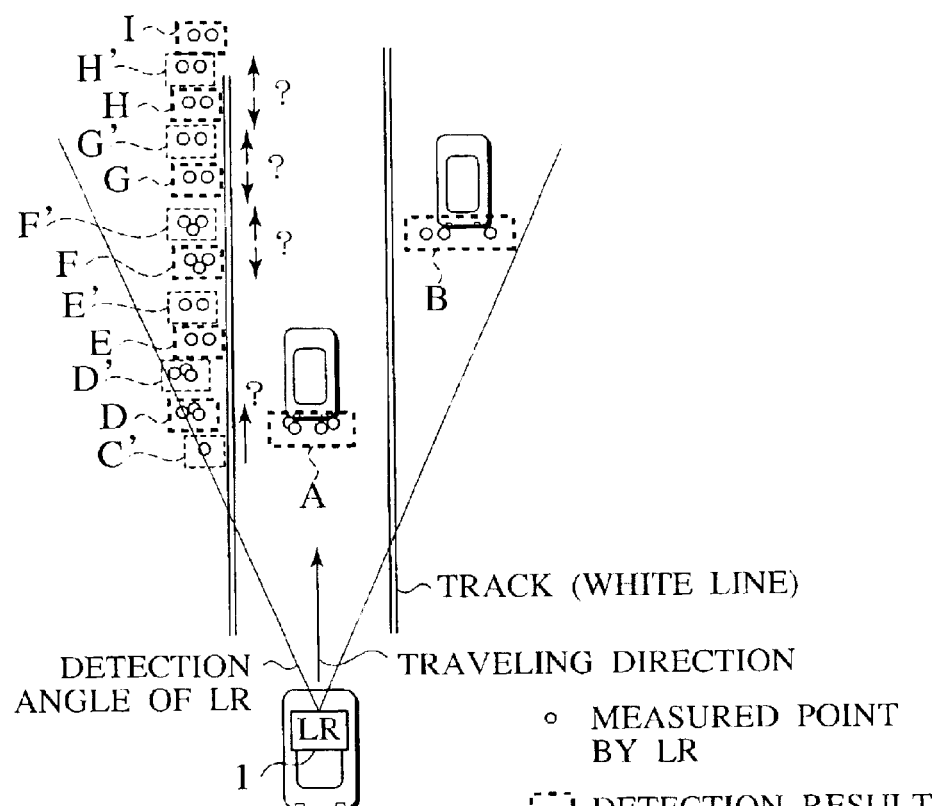
FIG. 25 is an explanatory view showing a state of superposing the crowded objects grouped individually at the time t·Δt and the time t.

FIGS. 23 to 25 are explanatory views showing an example of mismeasuring the relative speed of the objects in the case of applying the determination of the relative speeds, which has been explained with reference to FIGS. 16 to 18, to a scene where objects are crowded.

FIG. 23 shows the objects A' to H' detected at the time t·Δt, and FIG. 24 shows the objects A to I detected at the time t. Moreover, FIG. 25 is a view obtained by superposing FIGS. 23 and 24, and as understood from this drawing, the positions of the respective objects are changed with respect to one's vehicle during the time Δt. Note that the object C is out of a scanning area by the laser radar 11 in FIG. 24.

Then, the objects D to I (in FIG. 24) and the objects C' to H' (in FIG. 23) are in a crowded state when both of them are superposed (in FIG. 25), such that the object D' enters into the space between the objects D and E. Hence, the object detected at the time t cannot be made to correspond to the same object detected at the time t·Δt. In other words, though the object D is the original object D' after movement in scanning, this relationship will be unclear because the objects are crowded and an object that goes out of the detection angle exists.

Therefore, the relative speeds may be mismeasured. Hence, in order to avoid such a problem, the object determination similar to the conventional one based on the relative speeds may satisfactorily be carried out in a region other than the crowded region, and in the region determined to be crowded with the objects, the entire objects excluding the object determined to be a vehicle with high reliability may satisfactorily be determined to be road relating structural objects irrespective of relative speeds thereof (fifth determining step).

In this embodiment, the processing for setting crowded regions is carried out as shown in FIGS. 19 to 21B. Thus, even in a zone where road relating structural objects are crowded and apt to undergo the mismeasurement of the relative speeds, the road relating structural objects can be determined as they are without being mistaken for vehicles.

In such a manner, in the object type determining method for reflective objects on a track according to this embodiment, objects existing crowdedly among the objects detected by the laser radar 11 are set as one region, and based on the motion of this region (the change of the relative speed), it is determined whether the objects corresponding to the region are road relating structural objects or vehicles, thus enabling a highly precise object type determination.

Specifically, the mismeasurement for the running object and the road relating structural objects can be prevented, which is caused by the object type determination only by use of the relative speed. Particularly, en effective object determination is made possible in the zone where the reflective points are crowded, in which the misdetermination is apt to occur.

Ninth Embodiment

Next, the ninth embodiment of the present invention will be described.

Figure 26:
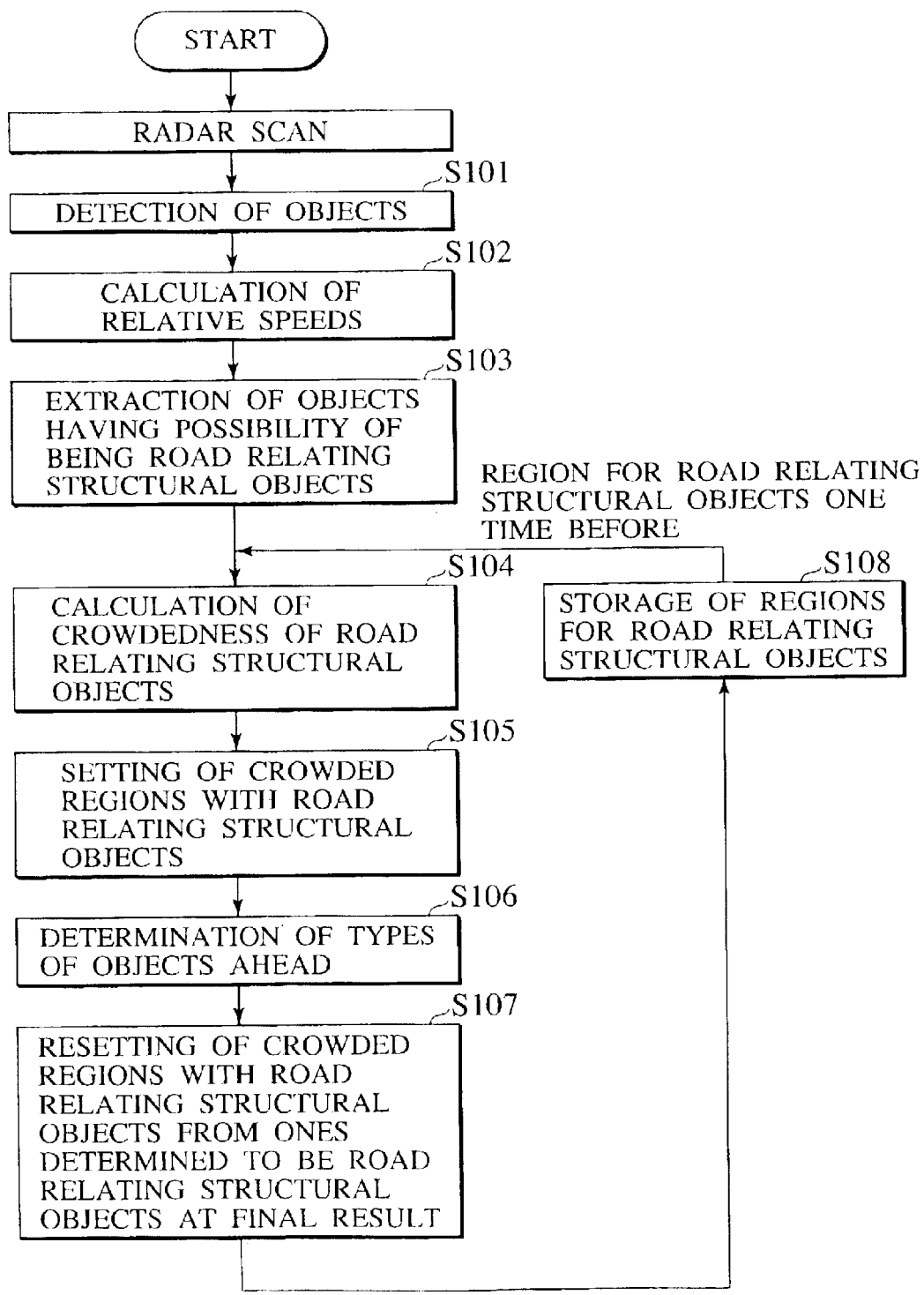
FIG. 26 is a flowchart showing a processing procedure of an object type determining method according to a twelfth embodiment of the present invention.

FIG. 26 is a flowchart showing a processing procedure for an object type determining method for reflective objects on a track according to the ninth embodiment. Because the system configuration thereof is the same as that in FIG. 1, description thereof will be omitted. A situation of the exhibiting effect of the ninth embodiment will be described below.

Figure 27A:
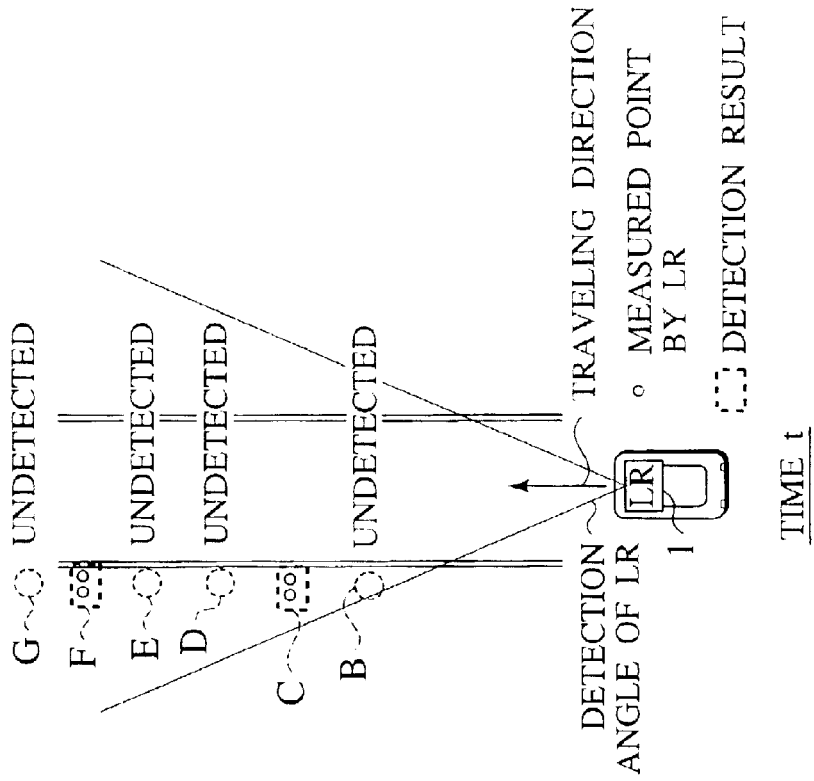
FIGS. 27A and 27B are explanatory views showing a state when objects exist, that are detected at the time t·Δt but are not detected at the time t.
Figure 27B:
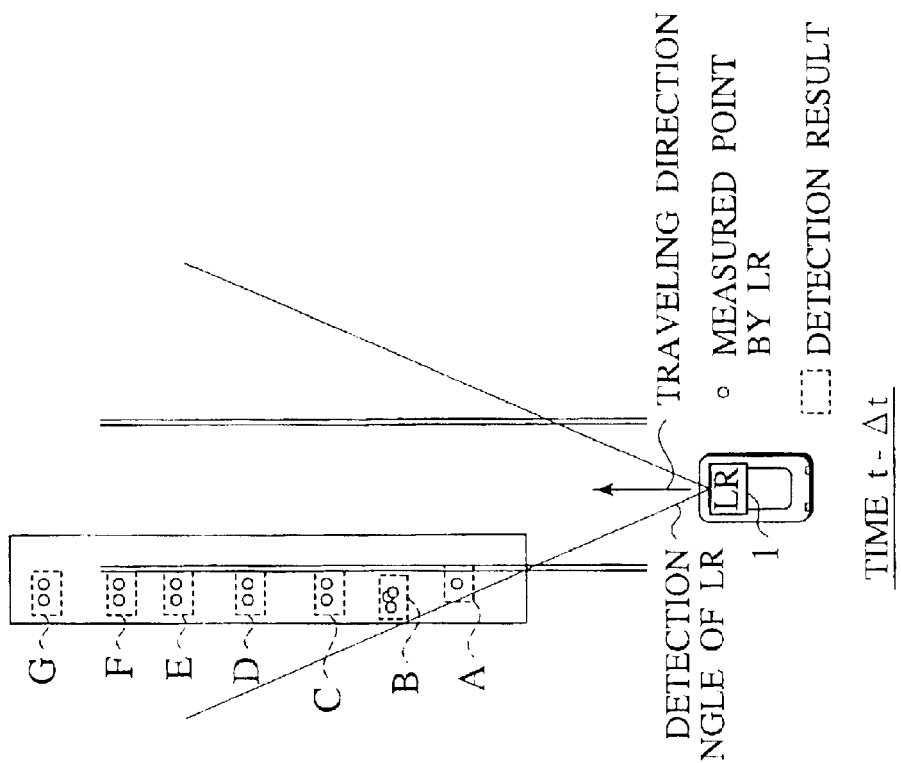

Detection/undetection of a road relating structural object may sometimes be iterated depending on exhaust gas emitted from a vehicle running ahead, a positional relationship with a vehicle in immediate front of the road relating structural object and the like. FIGS. 27A and 27B are explanatory views showing such a situation. At the time t·Δt, seven objects that are the objects A to G are detected as shown in FIG. 27A. On the other hand, at the time t after the elapse of the time Δt, only two objects that are the objects C and F are detected as shown in FIG. 27B.

Hence, it will be the object E that is located, at the time t·Δt, at the closest position to the object E detected at the time t. Therefore, the relative speed of the object F is mismeasured (that is, the object F is determined to have moved from the position of the object E to the position of the object F), and the detection would be carried out as if an object moving at a uniform speed existed.

Moreover, at the time t, objects before and after the object F are not detected (that is, the objects D, E and G are not detected). Therefore, the object F is undesirably determined to be low in crowdedness, and a highly precise region setting cannot be performed. The ninth embodiment is implemented for coping with such a situation.

In this embodiment, in order to avoid the situation where the crowdedness of the objects cannot be stably obtained since the objects are intermittently seen and hidden, the crowded region of the road relating structural objects which has been set one time before (before this time by time Δt), is adapted to be usable also at this time because a region of which object crowdedness has once been determined to be high must be high in crowdedness immediately thereafter.

Hence, the detection precision at the previous detection will affect the detection precision at the current detection. In this embodiment, the improvement of the detection precision is achieved by use of a procedure described below.

Specifically, in this embodiment, the object type determination described in the first embodiment (Step S106 in FIG. 15) is carried out (first storing step), and only objects determined to be road relating structural objects as a final result of the determination are used, and thus the region where the road relating structural objects are crowded is set one more time (Step S107 in FIG. 26). This setting may satisfactorily be carried out for the crowdedness and region of the objects by use of a similar method to the method described above with reference to FIGS. 20, 21A and 21B, which uses only the objects determined to be road relating structural objects at the final stage (second setting step).

At the final state (Step S108 in FIG. 26), the region where the road relating structural objects are crowded, the regions having been set by this method, is stored (second storing step), so as to be usable at the next time.

For example, as shown in FIG. 28, data to be stored can include the names of the objects (A to K), and the distances, the lateral positions, the relative speeds, the crowded regions, the types and the like, which correspond to the objects.

Figure 29A:
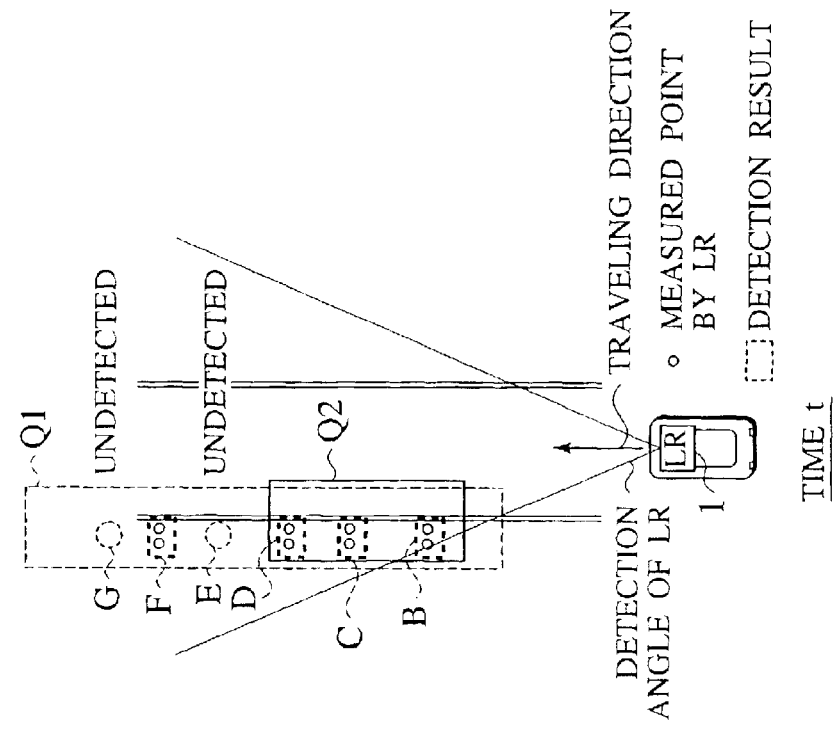
FIGS. 29A and 29B are explanatory views showing a state of setting regions based on objects obtained at the time t·Δt and objects obtained at the time t.
Figure 29B:
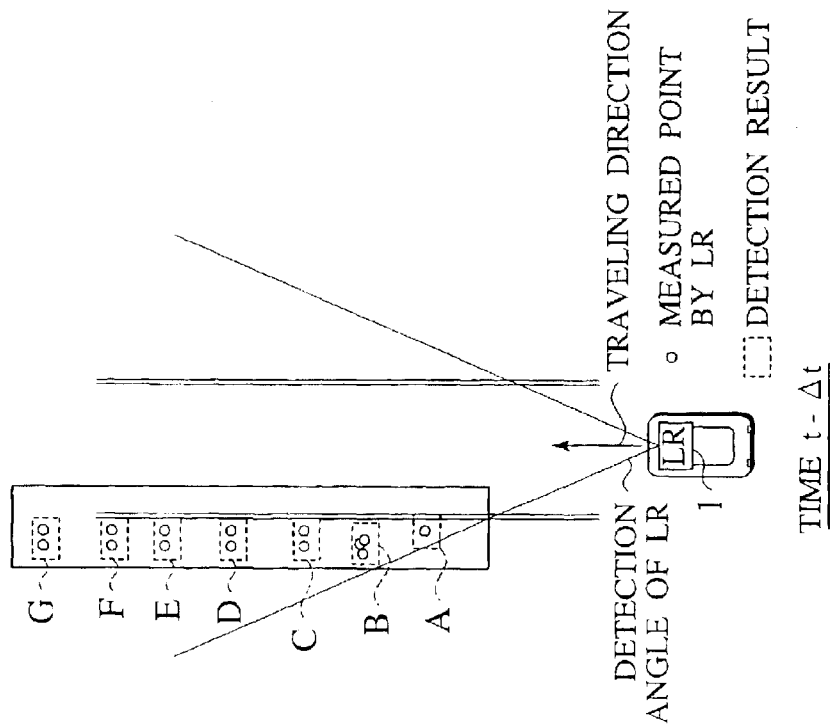

Subsequently, a current region setting method using the previous data regarding the regions, which has been stored by the foregoing operation, will be described. FIGS. 29A and 29B are explanatory views of the method. First, a region at the time t (region Q2) is set based on the objects having a possibility of being road relating structural objects by the similar method to the method described above with reference to FIGS. 20, 21A and 21B.

Subsequently, in the case of the region setting in the processing of Step S105, a region obtained by superposing the region set by the method described with reference to FIGS. 20, 21A and 21B based on the objects detected at the time t and the region set previously (region Q1) is set as the region where the road relating structural objects are crowded, which is to be used in the processing of Step S106.

Thus, even in the case where the objects are not detected though the objects actually exist at the time t while the objects are detected to be crowded at the time t·Δt, the region can be maintained as the region where the road relating structural objects are crowded, in which the objects actually exist.

Specifically, the relative speeds of the road relating structural objects can be securely obtained even in the case where the region is not detected to be a crowded region as shown in FIG. 27B, which is caused by unstable detection by the laser radar 11, though the region is actually crowded with the road relating structural objects and these road relating structural objects are detected at the time t·Δt as shown in FIG. 27A.

Moreover, the data of the region for the road relating structural objects, which is stored by the processing of Step S108, resets the crowded region with the objects based on the objects that are detected at the time t and finally determined to be road relating structural objects in the processing of Step S107 at the final stage. Therefore, when the object actually goes out of the detection angle (out of the scanning area by the laser radar 11), this region for the objects is determined not to exist in the next processing.

Specifically, the object A detected at the time t·Δt shown in FIG. 27A is determined not to exist at the time t shown in FIG. 27B because the object A is out of the detection angle of the laser radar 11. Hence, the data of the region for the road relating structural objects is held, thus causing no problem such that a crowded region is set in a region where no object does exist actually. Accordingly, the effect described in the above-described first embodiment can be maintained.

In such a manner, in the object type determining method for reflective objects on a track according to the ninth embodiment, a crowded situation with objects can be detected based on the past determination result (determination result obtained before the time t·Δt) even under an environment where the road relating structural objects are intermittently seen and hidden or undetected by the dirt by exhaust gas, the positional relationship with a running vehicle existing in front of the road relating structural objects on the road side and the like. Hence, even if the road relating structural objects are intermittently detected/undetected, the relative speed of the object to the region for the road relating structural objects can be securely obtained, thus making it possible to enhance the detection accuracy.

Tenth Embodiment

Next, an object type determining method for reflective objects on a track according to the tenth embodiment of the present invention will be described.

Similarly to the above-described ninth embodiment, the tenth embodiment also aims at maintaining a similar effect to the effect of the first embodiment in the case where one's vehicle runs on the side of the crowded region with the road relating structural objects that are not stably detected as shown in FIGS. 27A and 27B.

The above-described second embodiment has been configured to obtain the setting for the crowded region for use immediately before the object type determination by considering the previous crowded region (the time before this time by Δt). However, for example, as shown in FIG. 27A, a large number of the road relating structural objects A to G are detected at the time t·Δt, and as shown in FIG. 27B, only one or two road relating structural objects are detected thin at the time t. In such a case, a crowded region with objects cannot be set by utilizing the detection result at the time t. The detection result at the time t cannot be utilized under such a situation, and the crowded region with the objects becomes undesirably the same as a region one time before.

Accordingly, in this embodiment, in the case of setting the crowded region with the road relating structural objects in Step S103 shown in FIG. 26, not only the detection result at the time t but also the object existing in the crowded region with the road relating structural objects at the time t·Δt (object determined to be a road relating structural object) will be used.

Figure 30:
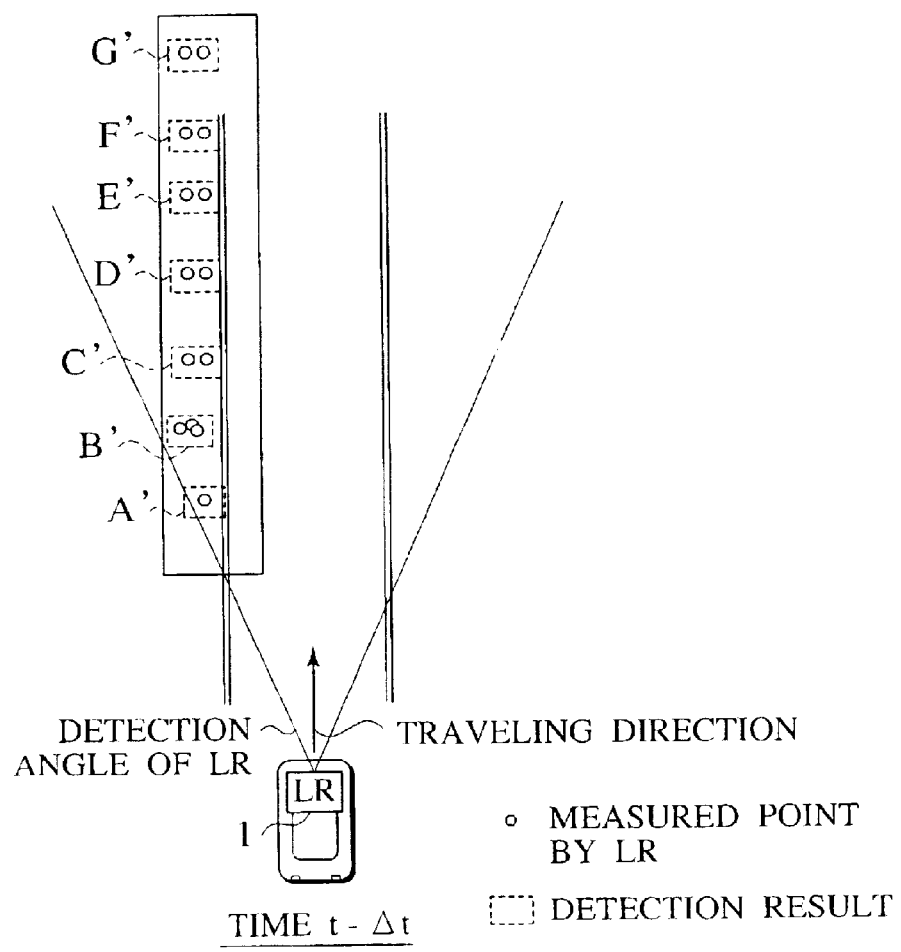
FIG. 30 is an explanatory view showing a state of objects grouped at the time t.
Figure 31:
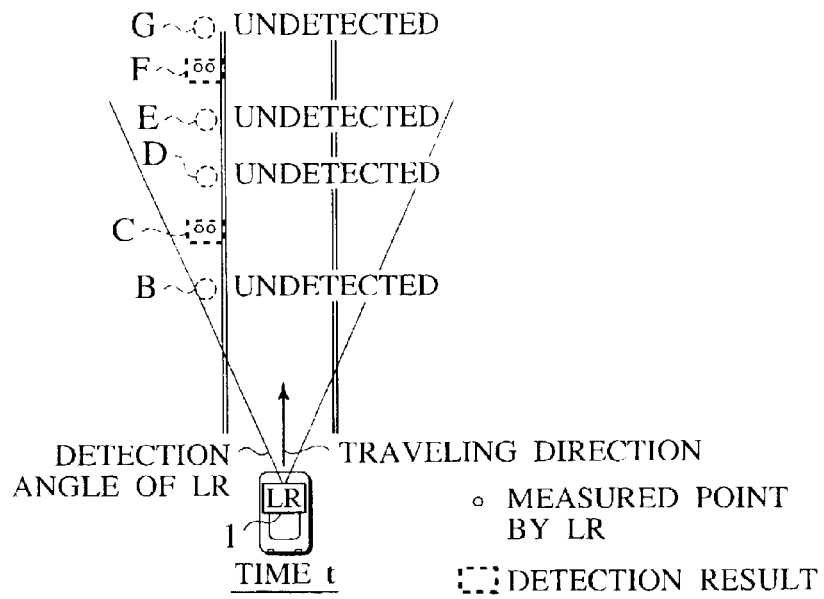
FIG. 31 is an explanatory view showing a state of objects grouped at the time t·Δt.

Specifically, in the case where the objects A' to G' are detected at the time t·Δt as shown in FIG. 30 and only two objects C and F are detected at the time t as shown in FIG. 31, data to be used for detecting a crowded region with objects the next time is generated by use of both of detection data at the time t·Δt and detection data at the time t.

Figure 32:
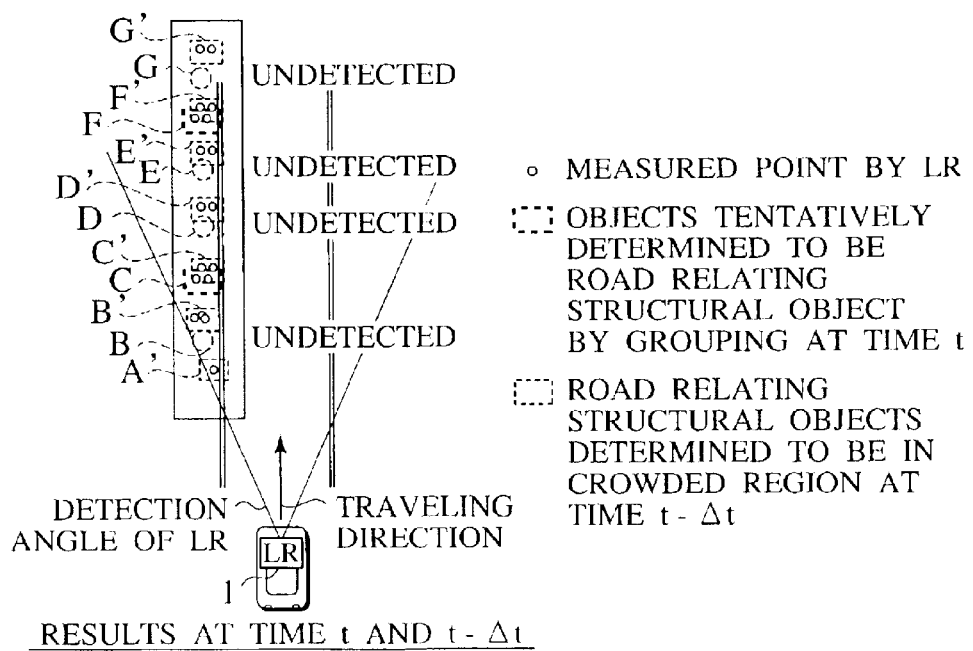
FIG. 32 is an explanatory view showing a state of setting highly crowded regions based on objects determined to be road relating structural objects at the time t·Δt and objects determined to be road relating structural objects at the time t.

Hence, as shown in FIG. 32, the data of the objects A' to G' will be obtained (however, with regard to objects duplicating at the times t and t·Δt, the objects detected at the time t are used). Based on this data, the correspondence data as shown in FIG. 28 is created.

As described above, in this embodiment, in the case of the calculation for the crowdedness which is carried out immediately after grouping the objects detected by the laser radar 11, both of the objects detected by the grouping at that point of time and the objects that existed in the crowded region immediately before (time before that time by Δt) and were determined to be road relating structural objects are used, and thus the crowded region to be used in the processing at the next time and after (correspondence data shown in FIG. 28) is set. Consequently, similarly to the above-described second embodiment, the relative speed of the object to the region for the road relating structural objects can be securely obtained even if the road relating structural objects are intermittently detected/undetected, and thus the detection precision can be enhanced.

Eleventh Embodiment

Next, an object type determining method for reflective objects on a track according to the eleventh embodiment of the present invention will be described.

Figure 33:
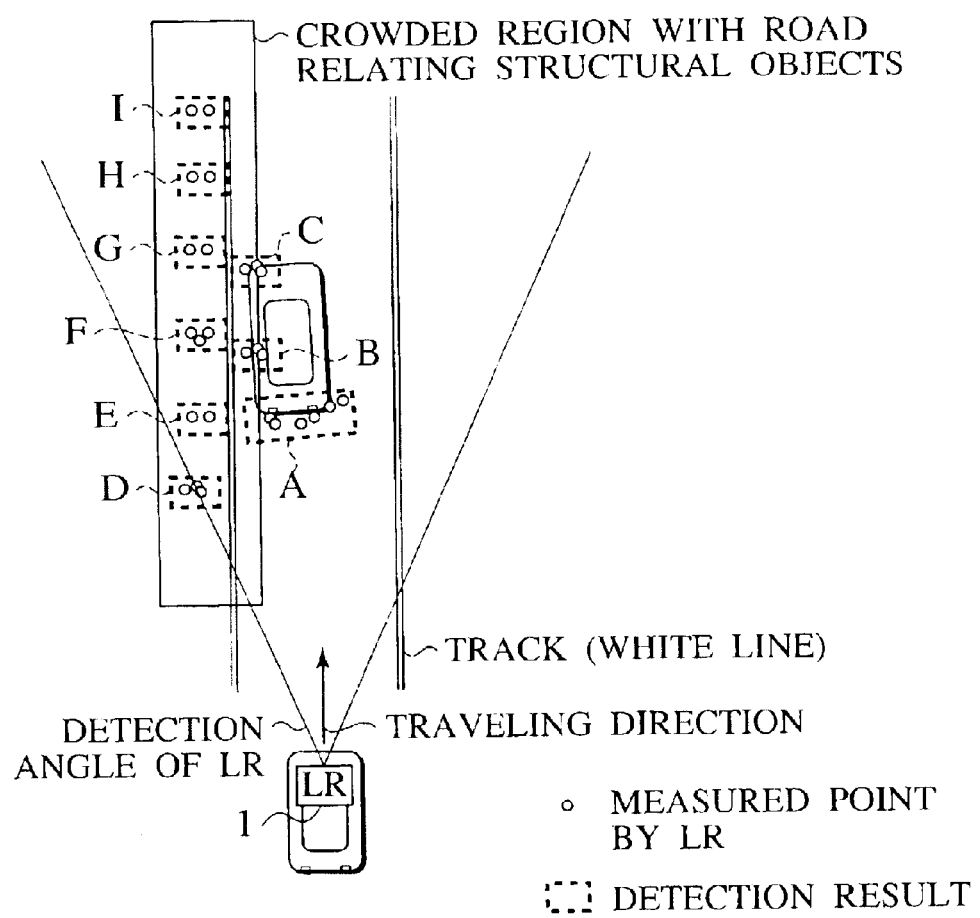
FIG. 33 is an explanatory view showing grouped objects when a large-sized vehicle passes through near a highly crowded region.

First, a situation where the effect of the eleventh embodiment can be seen will be described with reference to FIG. 33. FIG. 33 shows a scene where a large-sized vehicle such as a truck passes through a place in which a crowded region with road relating structural objects is set. In this drawing, the object denoted by the reference symbols A, B and C is a truck.

In such a case, if the region is set by use only of a grouping result, portions (A, B and C) including the reflective points of the truck may sometimes be set as crowded regions with road relating structural objects. In this embodiment, for the purpose of realizing a highly accurate detection for the road relating structural objects in such a case, the object that was continuously determined to be a running object in a region other than the region where the crowdedness of the objects was high in the past processing is determined to be high in determination reliability and to be a vehicle.

Thereafter, when this object is detected in the region where the crowdedness is high, this object is determined to be a vehicle, thus preventing the object from being misdetected as a road relating structural object. In this case, as described with reference to FIG. 22, the plurality of reflective objects may sometimes exist in the same vehicle, and the points existing on the same vehicle may be detected to belong to a plurality of objects at the stage of the processing for detecting and grouping objects in Step S101 shown in FIG. 15.

In such a case, as already described with reference to FIG. 22, this object can be determined to be a vehicle based on the distance difference between the farthest and closest positions of the detected object from/to one's vehicle and the crowdedness. Then, the entire points detected on the vehicle are regrouped as a vehicle in advance.

Which result belongs to which type among the results of grouping can be confirmed by the correspondence data as shown in FIG. 28. Hence, even if the reflective objects on the vehicle exist in the region for the road relating structural objects as the exemplified situation in FIG. 33, these reflective points can be securely determined to belong to the vehicle by use of such information. Thus, it is made possible to distinguish the road relating structural objects from the vehicle highly precisely.

In such a manner, in the object type determining method for reflective objects on a track according to the eleventh embodiment, the object that was continuously determined to be a running object in the region other than the region high in crowdedness in the past object type determination is determined to be high in determination reliability and to be a vehicle. Moreover, in the case of the object determination, the reliability is considered. Specifically, when this object is detected in the region high in crowdedness, this object is determined to be a vehicle.

Hence, even if a large-sized vehicle such as a truck approaches the region where the crowdedness of the objects is high, this large-sized vehicle can be accurately determined to exist without being mistaken for the road relating structural objects. Moreover, conditions such that a crowded region should be longer than a vehicle length are added to the setting for the crowded region, thus making it possible to prevent the occurrence of a misdetermination such that a vehicle attached with a large number of reflective objects is a road relating structural object. Thus, the object running ahead can be accurately determined to be a vehicle. Therefore, even if the vehicle attached with a large number of reflective objects such as a large-sized vehicle runs on the side of the road relating structural objects, it can be securely recognized that the vehicle exists in the road relating structural objects without being adversely affected by such as a lost vehicle in the determination for the road relating structural objects.

Twelfth Embodiment

Next, the twelfth embodiment of the present invention will be described.

FIG. 10 is a configurational diagram of an ahead vehicle measuring apparatus to which an object type determining method for reflective objects on a track according to the twelfth embodiment is applied.

As illustrated in this drawing, this ahead vehicle measuring apparatus 20 includes the scanning laser radar (measuring apparatus) 11 for measuring a distance and a direction to an object in front thereof by irradiating a laser beam in front of one's vehicle and detecting the laser beam reflected on a reflective object in front thereof, the object detection processing unit 12, and the object type determination unit 13. Furthermore, the ahead vehicle measuring apparatus 20 includes the camera 15 for taking a photograph of an image around one's vehicle, and the image processing unit 16 for processing the data of the image photographed by the camera 15.

The object detection processing unit 12 includes the memory 12a for storing therein data of a distance and a direction to an object existing within a scanning angle by the scanning laser radar (hereinafter, abbreviated as a "laser radar"), and the processing unit 12b for detecting the object existing in front thereof based on the data.

The object type determination unit 13 determines the type of the object in front thereof, that is, determines whether the object is a road relating structural object or a vehicle running ahead based on the past detection result of an object detected in front thereof and a size of a region set for the object.

Figure 34:
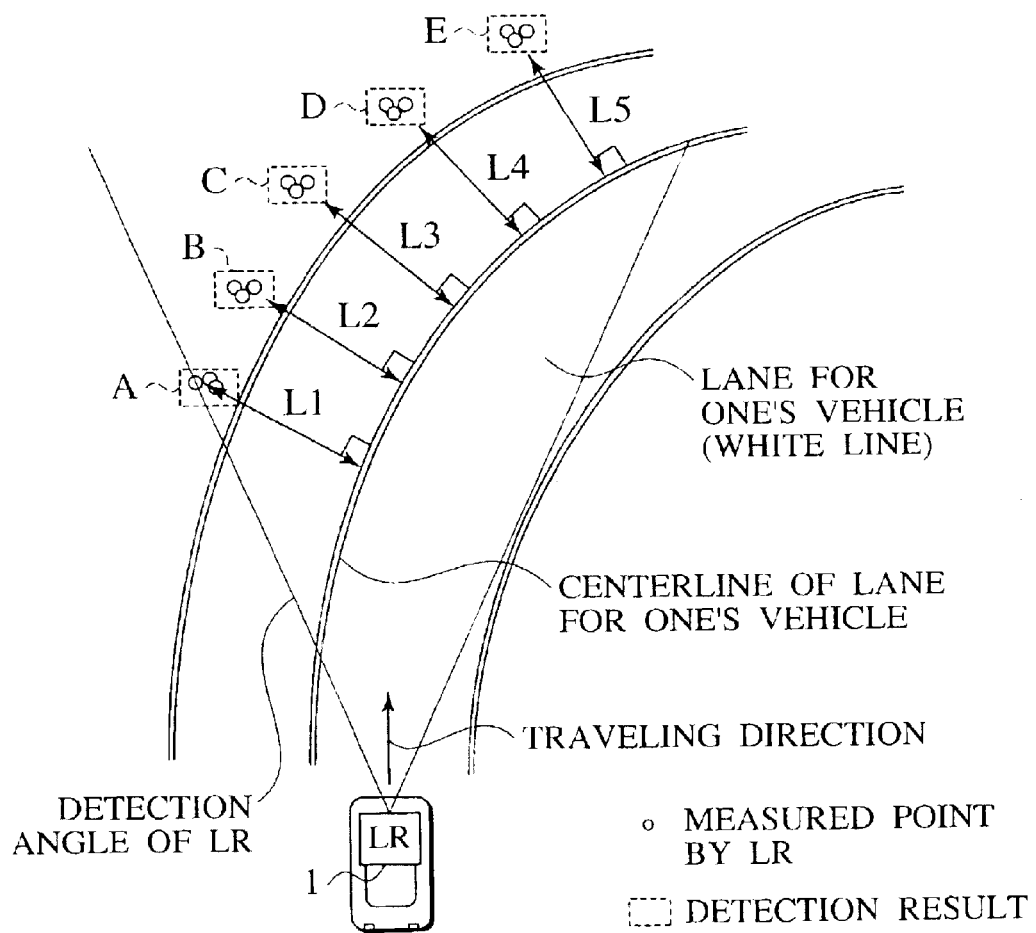
FIG. 34 is an explanatory view showing positional relationships between objects detected along a curved road and a centerline of a lane for one's vehicle.

FIG. 34 is an explanatory view showing a situation to which the method according to the twelfth embodiment is applied.

The reference symbols L1 to L5 shown in this drawing denote distances from road relating structural objects belonging to the same region (objects A to E) to a centerline of a lane for one's vehicle. Usually, reflective objects provided along with a road, such as delineators, center poles and sidewalls, are located along a shape of a track. A region for these road relating structural objects can be set by the method described above with reference to FIGS. 20, 21A and 21B (selecting step).

Then, it can be determined whether or not the road relating structural objects are located along the lane for one's vehicle based on a variance of distances to the lane for one's vehicle, which are perpendiculars drawn from the respective objects A to E determined to be the road relating structural objects to a line that draws the center of 10 the lane for one's vehicle as indicated by the reference symbols L1 to L5 in FIG. 34. In other words, when the variance is small, these road relating structural objects can be determined to be along the lane for one's vehicle.

Moreover, when the variance is determined to be small, the center of gravities in this case may satisfactorily be set at the distance between the group of the road relating structural objects and the center of the lane for one's vehicle (operating step). The reason for setting the center of gravities is that, in the case where these road relating structural objects include a reflective object such as a signboard that is not along the track, detection points thereof are adapted not to be shifted, affected by such a small number of objects. Alternatively, the distances to the center of the lane for one's vehicle may be obtained after extracting only small objects in advance (that is, after removing a large object such as a signboard).

Therefore, when a crowded region with the road relating structural objects is set, it is first determined whether or not this region is along the lane for one's vehicle by the foregoing method. Then, when determined to be along the track, this crowded region is extended so as to be along the track. Thus, the region where the road relating structural objects exist can be set similarly to the ninth and tenth embodiments even if one's vehicle is running on the side of the road relating structural objects that are not stably detected.

In such a manner, the existence of the road relating structural objects can be securely detected even if one's vehicle is running on a curved road.

Moreover, even if the crowded region is not set in a range of a certain distance, when a crowded region is set in a shape along the track in the nearer position or deeper position thereof, reflective objects for drawing the shape of the track, such as delineators and center poles, are provided in a region obtained by extending the crowded region in many cases.

Figure 35:
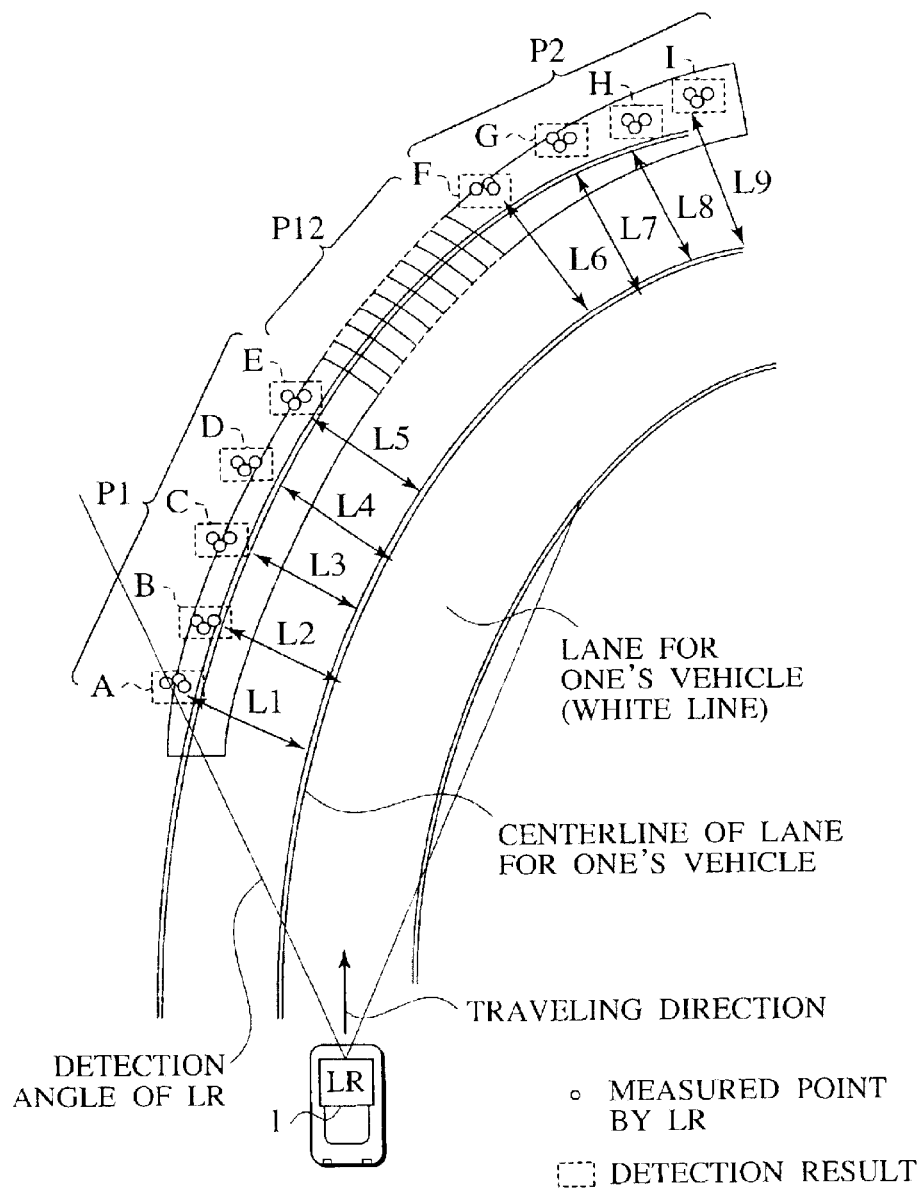
FIG. 35 is an explanatory view showing a state of interpolating a region between two highly crowded regions detected along the curved road.

The above will be described with reference to the explanatory view shown in FIG. 35. As illustrated in this drawing, when the road relating structural objects A to I are detected on the curved road and an interval is comparatively spaced between the structural objects E and F, two crowded regions P1 and P2 are detected. Hence, the crowded regions P1 and P2 will be undesirably determined to be object groups different from each other without any measures taken. Accordingly, in this embodiment, processing to be described below is carried out, and thus these are determined to belong to the same group of objects.

First, a distance L from this crowded region P1 to the centerline of the lane for one's vehicle is calculated from the distances L1 to L5 from the structural objects A to E to the centerline of the lane for one's vehicle. Similarly, a distance L' from this crowded region P2 to the centerline of the lane for one's vehicle is obtained from the structural objects F to I to the centerline of the lane for one's vehicle. Then, the sizes of the distances L and L' are compared with each other. When the sizes are approximately equal to each other, these are regarded as the same structural objects (in other words, the regions P1 and P2 are regarded as the same), and a region (region P12) is interpolated between the regions P1 and P2 so as to connect each other. Then, this interpolated region and the regions P1 and P2 shape up to one region.

Hence, even if the track approaches the curve, the road relating structural objects can be securely determined to be as they are.

Moreover, in the above-described processing, the shape of the lane for one's vehicle (curve degree) can be obtained by applying data of gyrocompass and a steering angle to a kinetic equation of a vehicle. Moreover, if the vehicle is of a camera-mounted type, the curve degree can be obtained by detecting a white line by means of image processing.

Then, the distances from the center of the lane to the array of the road relating structural objects located along the track, such as delineators and sidewalls, are obtained by the method as described above. The region is reset based on the values of the distances by a technique such as interpolation of a region between the road relating structural objects in the nearer and deeper positions of the roadside in the case where the same distances are obtained in both of the road relating structural objects. Thus, it is made possible to securely set the region for the array of the road relating structural objects even if the detection of the reflective points is unstable.

Figure 36:
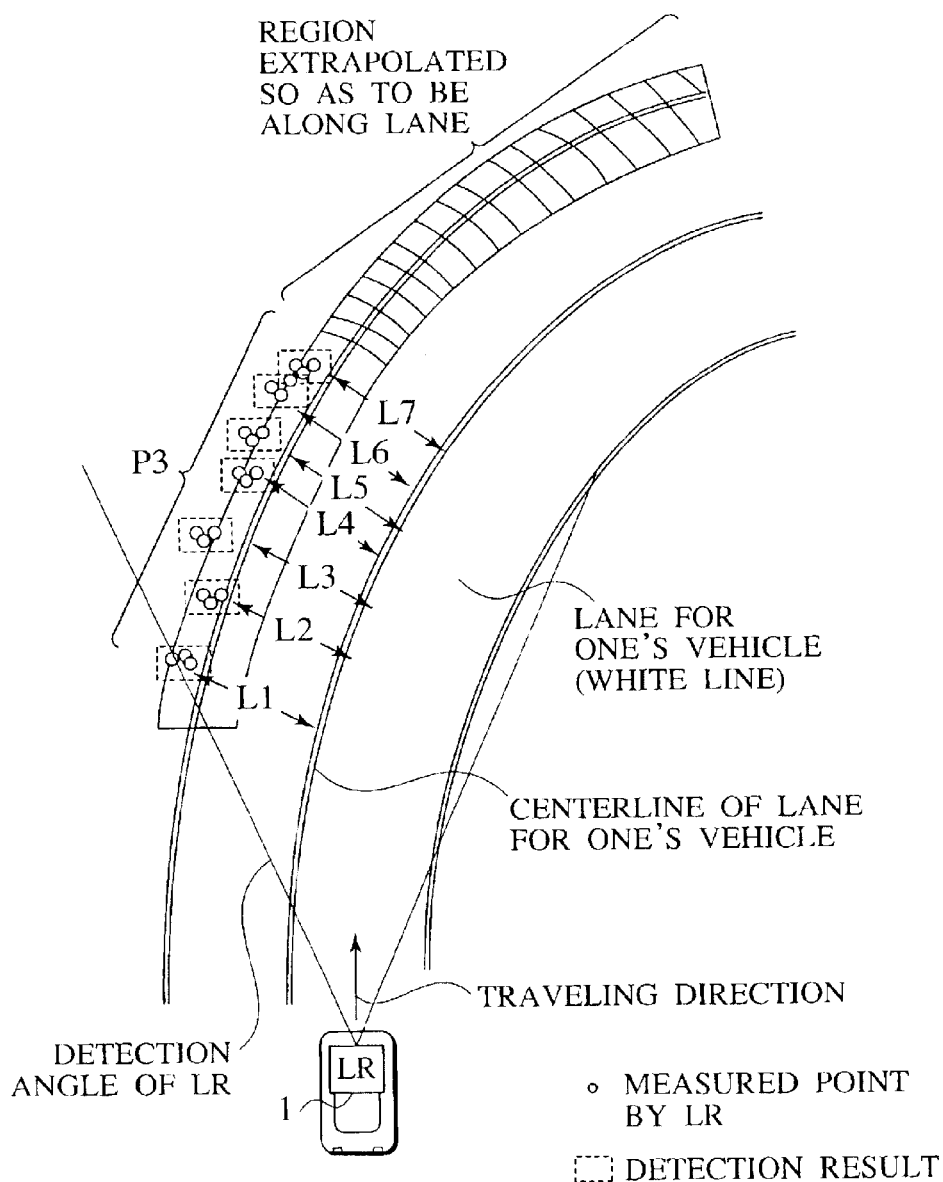
FIG. 36 is an explanatory view showing a state of setting a region of road relating structural objects existing on a roadside by extrapolating a highly crowded region detected along the curved road.

Moreover, as shown in FIG. 36, if the crowded region along the lane for one's vehicle is detected, then a region extended to the direction along the lane for one's vehicle is reset as the crowded region, thus making it possible to detect the road relating structural objects with higher precision.

Figure 37:
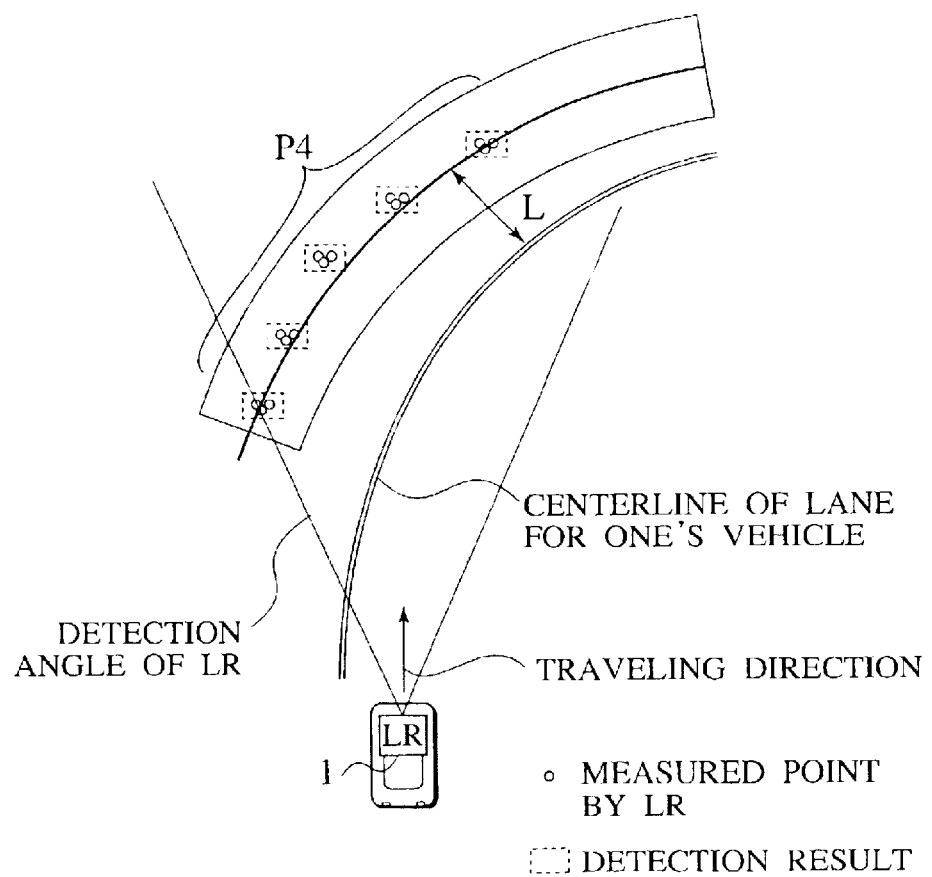
FIG. 37 is an explanatory view showing a region set by extrapolating a highly crowded region detected along the curved road.

Specifically, when the region P3 along the lane for one's vehicle as shown in this drawing is obtained, the region P3 is extrapolated so as to be along this lane for one's vehicle. Thus, for example as shown in FIG. 37, the crowded region P4 with the road relating structural objects can be set at a point moved parallel from the center of the lane for one's vehicle by the distance L (third setting step).

In such a manner, in the object determining method for reflective objects on a track according to the twelfth embodiment, it becomes possible to correctly determine the entire road relating structural objects such as delineators located along the side of the track to be as they are without being mistaken for a vehicle irrespective of the intervals of the road relating structural objects and the obtained relative speeds.

Moreover, for example, even if objects are not detected in the vicinity of an intermediate range of distance between distant and close points from/to one's vehicle though objects are detected to exist crowdedly in the distant and close ranges, that is, even if crowded objects are not detected in the vicinity of the intermediate range, which originates from the dirt on the delineators, or because the objects are seen and hidden by obstacles, the region can be determined to be the array of the structural objects such as delineators. Therefore, similarly to the above embodiments, the objects can be correctly determined to be the road relating structural objects regardless of the mismeasurement of the relative speeds.

Thirteenth Embodiment

Next, the thirteenth embodiment of the present invention will be described.

Here, when it is determined that there exist road relating structural objects located so as to be along a shape of a track, only if the crowdedness of the structural objects is higher than a predetermined value (a value of crowdedness), then lines connecting the objects determined to be the road relating structural objects one another are determined to be the shape of the road in front of one's vehicle. The value of crowdedness may satisfactorily take as references to an extent, for example, the number to be picked up thereof approximately capable of representing a shape in which a residual among the values of crowdedness are small.

For the determination as to whether the objects form a shape along the lane, the above-described methods described in up to the twelfth embodiment may satisfactorily be applied. Thus, all that road shape can be precisely obtained because a distance measuring device such as a radar can usually detect a distant object by the image processing.

In such a manner, the thirteenth embodiment has an advantage that a lane shape measurement will be made possible through grasping a more distant lane shape comparing with a lane shape grasped by the image processing and the like. Moreover, because the shape of the lane can be measured by the laser radar 11, it will be able to determine whether another object exists inside or outside the lane by obtaining positional relationships among the scanned points. For example, this embodiment has an advantage of preventing a misdetermination of an object on the outside delineators for an object on the lane on a curve road or the like where a distant track shape is not understood.

In the present invention, suppose a case where it is difficult to detect a plurality of detection objects at relative positions proximal to one another and to accurately measure the relative speeds of the individual detection objects, such as a case where the plurality of detection objects provided at a narrow interval (for example, road signs such as delineators, and reflectors provided on a side portion of a large-sized vehicle) are detected in the first detecting step. Even in the above-described case in the present invention, as described above, the same labels are given to these detection objects by the first labeling step, and then it can be determined whether the detection objects being given the same labels are a group of objects belonging to the same object (for example, door mirrors, reflectors and the like) or a group of the same type of objects (for example, a group of road signs) by the first determining step.

Here, the first predetermined distance in the present invention is set somewhat shorter than a usual vehicle so that the same labels cannot be given to the detection objects detected individually from two or more vehicles.

Thus, even in the case where the relative speeds of the individual detection objects cannot be accurately measured, the types of the detection objects can be determined accurately.

Moreover, in the present invention, even in the case where the same labels are given to the detection objects different from each other in type, for example, even in the case where the same labels are given to road relating structural objects (detection objects, for example, road signs) and reflectors (detection objects) equipped with a vehicle running in the vicinity of these road signs, the set of the detection objects can be accurately isolated without a misdetermination for the group of the object belonging to the same object or the group of the same type of the objects by the second labeling step. Thus, the types of these detection objects can be determined accurately.

Moreover, in the present invention, in the case where the variance value of the distances to the reference line from the detection objects of the set being given the same labels is smaller than a predetermined value, and in the case where the set of the detection objects is detected at relative positions out of the lane in front of one's vehicle in the first detecting step, the set of the detection objects is determined to be a group of road signs in the first determining step.

Here, the predetermined value is set somewhat larger than the variance value of the distances to the reference line on this lane from the group of the road signs generally located outside a lane.

Thus, it can be determined more accurately whether or not the type of the set of the detection objects being given the same labels is the road signs.

Note that the road signs such as delineators are located for the purpose of indicating the road shape, and therefore, the plurality thereof are located along the lane on the outside of the lane. In other words, the plurality of road signs are located so that the distances therefrom to the reference line on the lane can be substantially the same.

Hence, the variance value of these distances becomes a substantially constant value regardless of the type of the road signs, thus making it possible to set the predetermined value somewhat larger than this variance value.

Moreover, in the present invention, prior to the first determining step, a size measuring step of measuring the sizes of the detection objects detected by the first detecting step is further carried out. Then, in the first determining step, when detection objects larger than a predetermined size is included in the set of the detection objects being given the same labels in the first labeling step, the set of the detection objects is determined to be the group of the objects belonging to the same vehicle.

Here, the predetermined size in the present invention is set smaller than the sizes of the detection objects measured by the size measuring step when a part of a usual vehicle is detected to be detection objects by the first detecting step, and the predetermined size is set larger than the sizes of the detection objects measured by the size measuring step when usual road signs are detected to be the detection objects by the first detecting step.

Hence, it can be determined more accurately whether or not the type of the set of the detection objects being given the same labels is the group of the objects belonging to the same vehicle.

Moreover, in the present invention, when a predetermined number of the first detection objects having the determination result to the effect that they are road signs in the third detecting step, the same labels are, through the fourth labeling step, given to the first detection objects detected by the third detecting step. When another detection object exists within the third predetermined distance from any of the first detection objects, the same label as that of the first detection objects can be given to another detection object.

Here, while the predetermined number in the present invention is set in accordance with the type or the like of the road signs, it is desirable to set the number somewhat large (for example, the number of three or more) so that the type of another detection object can be determined accurately by the first determining step.

Moreover, though the length of the second predetermined distance in the present invention is set in accordance with the predetermined number and the type of the road signs, it is desirable to set the length of the second predetermined distance two to three times the first predetermined distance so that the type of another detection object can be determined accurately by the first determining step.

Thus, even in the case where the distances to another detection object from one set of the first detection objects as a group of road signs become longer than the first predetermined distance, the same labels can be given to the set of the detection objects and another detection object by the fourth labeling step. Such a case as described above can occur in the case where a part of the group of the road signs is not able to be detected due to the dirt by exhaust gas and the like when detecting the group of the road signs. Hence, another detection object is also a road sign in such a case.

Then, another detection object can be determined to be the road sign by the second determining step.

Hence, even if the distances to another detection object from the first detection objects in the set as the road signs becomes longer than the first predetermined distance, it can be determined accurately whether or not the type of another detection object is a road sign.

Moreover, in the present invention, the same labels are given to the second and third detection objects in the first labeling step in the following detection case. Specifically, the case is where the second detection object larger than the predetermined size is detected by the first detecting step. Moreover, the case is where the third detection object is detected by the first detecting step in the deeper range from the second detection object and within the third predetermined distance from the second detection object when seeing the transmitting direction of the detection wave from the detection wave output device. Furthermore, when the fourth detection object exists within the third predetermined distance from any of the second and third detection objects, the same label as that of the second detection object is given to the fourth detection object.

Here, it is desirable to set the third predetermined distance somewhat longer than the usual vehicle length so that the same labels cannot be given to the detection object detected from a large-sized vehicle and the detection objects detected from vehicles existing in the vicinity of the large-sized vehicle (which exclude vehicles mounted on the large-sized vehicle) by the fourth labeling step.

Hence, when the reflective point detection device scans the large-sized vehicle such as a car transporter mounting vehicles thereon and a tanker truck, the same labels can be given to the second to fourth detection objects even in the following case by the first detecting step. Specifically, the case is where the rear portion of the large-sized vehicle (second detection object) is detected. Moreover, the case is where objects existing within the third predetermined distance from the rear portion of the large-sized vehicle in the deeper range behind the rear of the large-sized vehicle when seeing the transmitting direction of the detection wave from the detection wave output device (for example, the rear portions of the vehicles mounted on the car transporter; third detection objects) are detected. Furthermore, the case is where the fourth detection objects existing within the third predetermined distance from any of the second and third detection objects (for example, door mirrors provided on the front portion of the large-sized vehicle) are detected.

Hence, the second to fourth detection objects which are given the same labels can be determined to be the group of the objects belonging to the same vehicle by the first determining step. Therefore, even if the plurality of detection objects belonging to the same large-sized vehicle are detected, the detection objects can be accurately determined to be the group of the objects belonging to the same vehicle without being misdetermined to be groups of objects belonging to different vehicles.

Moreover, when the steps up to the first labeling step is performed certain times and the second and third detection objects are detected in the respective steps, the second and third detection objects can be said to be detection objects belonging to the same large-sized vehicle. Therefore, in the present invention, the first detection object and the detection objects being the given the same labels as that of the first detection object are determined to be the group of the objects belonging to the same large-sized vehicle.

Hence, it can be securely determined whether or not the set of the detection objects is the group of the objects belonging to a large-sized vehicle. Moreover, such a determination has an advantage, for example, in that is can be used for the inter-vehicle distance control in response to the type of the ahead vehicle, such as elongation of the inter-vehicle distance more than in the case where the ahead vehicle is a vehicle of a usual size when the ahead vehicle is a large-sized vehicle.

Moreover, in the present invention, the position measuring device on-board such as a laser radar for measuring the distance and the orientation to an object existing in front thereof is used. Among the points detected and measured for positions thereof, an aggregation of points in the same distance and in positions proximal to one another is grouped as points on the same object for each certain time interval.

Then, the relative speeds of the respective objects detected by the grouping are obtained from the positions of the objects detected continuously for each predetermined time interval. Then, objects leaving a possibility of being road relating structural objects are selected based on the past information and sizes of the objects based on the object detection result by the grouping. From the positional relationship among the entire objects having the possibility of being road relating structural objects, the crowdedness of the objects is obtained when seeing the location of these objects as an array in the depth direction or the traveling direction.

Thereafter, when the group of the objects determined to be high in crowdedness exists, a region where these objects are detected is set as a region where road relating structural objects exist with high crowdedness, the type of the objects in the region is determined by use of data of the positions, sizes and the like of the objects, which is obtained from the relative speeds, the grouping and the like after determining that a possibility of mismeasurement in the relative speeds is high. Then, the objects detected in the region where the crowdedness is high among the objects determined to hold the possibility of being the road relating structural objects are determined to be the road relating structural objects in the case of the object determination irrespective of the relative speeds of the objects.

Thus, the misdetermination of the running objects for the road relating structural objects, which is caused by the object type determination depending only on the relative speeds, can be prevented. Particularly, the mismeasurement of the relative speeds is apt to occur in the zone where the reflective points are crowded, and the method is effective in such a situation.

Moreover, in the present invention, the types of the objects detected by the grouping are stored every time, and only the objects determined to be the road relating structural objects are extracted after the object type determination. Thereafter, the crowdedness and region of the objects are obtained from the positions of the objects. Then, the region is stored every time, and when the crowded region is set by use of information immediately after the regrouping of the objects in the next processing, a region obtained by superposing the region set by use of the information immediately after the grouping and a region stored one time before is set as a crowded region.

Thus, even under an environment where the objects are seen intermittently or undetected originating from the dirt by exhaust gas and the positional relationship with a running vehicle located before the road relating structural objects, and thus the crowdedness cannot be accurately obtained even though the objects are actually crowded, the objects can be determined to be crowded, and the misdetermination of the types of the objects can be prevented.

Moreover, in the present invention, in the case of the crowdedness calculation performed immediately after the grouping, the region is set by use of both of the grouping result at that point of time and the objects determined to be in the crowded region and to be the road relating structural objects determined immediately before the grouping. Thus, the misdetermination of the types by the mismeasurement of the relative speeds can be prevented, which is caused by that the crowdedness is not accurately obtained though the objects are actually crowded.

Moreover, objects that have been continuously determined to be running objects in the region other than the region where the crowdedness is high in the past object type determination are determined to be vehicles with high reliability. This reliability is considered in the case of the object determination. In the case where the objects determined to be vehicles with such high reliability are detected in the region where the crowdedness is high, the objects are to be determined being vehicles.

Thus, even if a vehicle approaches the region where the crowdedness is high, the vehicle can be accurately determined to be as it is without being mistaken for a road relating structural object. Moreover, by adding conditions such that the crowded region is set longer than a vehicle length, a vehicle equipped with a large number of reflective objects can be prevented from being misdetermined for the crowded road relating structural objects. Even if a large-sized vehicle equipped with a large number of reflective objects runs on the side of the road relating structural objects, the vehicle can be securely determined to be in the road relating structural objects without being adversely affected by the lost vehicle or the like, which is caused by the misdetermination for the road relating structural objects.

Moreover, in the present invention, the device for obtaining the shape of the lane in front of one's vehicle is added, and the shape of the lane in front thereof, which is obtained by the device, and only objects with a narrow width, which exist in the regions determined to be high in crowdedness and are determined to be the road relating structural objects, are extracted. Among them, for the entire road relating structural objects that exist in one region and have a narrow width, distances to the center of the lane of one's vehicle and the center of gravities of the distances are obtained.

Then, a region moved in parallel from the center of the lane of one's vehicle by such a distance is set at a region where a large number of objects are detected, that is, a region where the object crowdedness is high for the road relating structural objects provided along the lane.

Thus, the entire delineators provided along the road by the side thereof will be able to be accurately determined to be as they are without being mistaken for vehicles regardless of the interval thereof and the obtained relative speeds. Moreover, for example, even in the case where, though objects are detected in the distant and close regions, objects are undesirably detected at a wide interval in the intermediate distance to make it impossible to accurately obtain the crowdedness because of intermittent detection or the dirt on the delineators though the objects actually exist there, the intermediate region is determined to have an array of the delineators. Thus, the road relating structural objects can be accurately determined to be as they are irrespective of the mismeasurement of the relative speeds.

Moreover, in the present invention, when the crowdedness of the objects is higher than a predetermined value in the case where the region for the objects is set along the shape of the lane, the group of the crowded objects is determined to be an array of reflective plates provided along the road, and a line connecting to one another is determined to be a shape of a road in front of one's vehicle. Thus, the measurement for the shape of the lane, which use information concerning more distant regions than those in the lane shape detection by image processing, will be made possible because the laser radar can usually detect objects at a more distant place than the image processing.

Japanese Patent Application No. 2002-83738 filed on Mar. 25, 2002 and Japanese Patent Application No. 2002-66875 filed on Mar. 12, 2002 are expressly incorporated herein by reference in its entirety.

What is claimed is:

1. A method for determining an object type of a reflective object on a track, comprising:
    a reflective point detecting step of detecting a plurality of reflective points in front of one's vehicle in a traveling direction, including scanning ahead of one's vehicle in a traveling direction by a predetermined detection wave output device, detecting reflective points reflecting detection waves outputted by the detection wave output device, and measuring relative positions of the reflective points with respect to one's vehicle;

a first detecting step of grouping the plurality of reflective points detected in the reflective point detecting step by a predetermined standard and regarding the grouped reflective points as detection objects, including detecting the detection objects by determining reflective points detected at relative positions proximal to one another among the reflective points to be points on the same detection object;

a relative speed measuring step of measuring relative speeds of the detection objects detected by the first detecting step with respect to one's vehicle;

a first labeling step of giving the same labels to detection objects existing within a first predetermined distance among the detection objects;

a first determining step of determining types of the detection objects based on the relative speeds detected in the relative speed measuring step, and determining a set of the detection objects being given the same labels in the first labeling step to be any of a group of objects belonging to the same object and a group of the same type of objects;

a first data storing step of identifiably storing first data including labeling results by the first labeling step for each of the detection objects detected by the first detecting step after performing steps up to the first labeling step prior to performing the first determining step;

a second detecting step of further performing steps up to the first detecting step;

a second labeling step of attaching the same labels to detection objects existing within the first predetermined distance among detection objects detected by the second detecting step;

a comparing step of mutually comparing the labeling results for a set of the detection objects being given the same labels by the second labeling step; and a third labeling step of giving the same labels again to the detection objects which are given the same labels by the first labeling step and deleting labels being given to detection objects which are given no labels by the first labeling step among the set of the detection objects, in a case of determining that the labeling results are not entirely the same based on a comparison result by the comparing step.

2. A method for determining an object of a reflective object on a track, comprising:

a reflective point detecting step of detecting a plurality of reflective points in front of one's vehicle in a traveling direction, including scanning ahead of one's vehicle in a traveling direction by a predetermined detection wave output device, detecting reflective points reflecting detection waves outputted by the detection wave output device, and measuring relative positions of the reflective points with respect to one's vehicle;

a first detecting step of grouping the plurality of reflective points detected in the reflective point detecting step by a predetermined standard and regarding the grouped reflective points as detection objects, including detecting the detection objects by determining reflective points detected at relative positions proximal to one another among the reflective points to be points on the same detection object;

a relative speed measuring step of measuring relative speeds of the detection objects detected by the first detecting step with respect to one's vehicle;

a first labeling step of giving the same labels to detection objects existing within a first predetermined distance among the detection objects;

a shape detecting step of detecting a relative position of a reference line provided on a lane in front of one's vehicle with respect to one's vehicle; and a first determining step of determining types of the detection objects based on the relative speeds detected in the relative speed measuring step, and determining a set of the detection objects being given the same labels in the first labeling step to be any of a group of objects belonging to the same object and a group of the same types of objects, wherein in the first determining step, distances from respective sets of the detection objects being given the same labels to the reference line provided on the lane in front of one's vehicle are measured and a variance value of the distances is measured based on a detection result by the shape detecting step, and the sets of the detection objects are determined to be groups of road signs in a case where the variance value is smaller than a predetermined value and the sets of the detection objects are detected at relative positions out of the lane in front of one's vehicle by the first detecting step.

3. The method for determining an object type according to claim 2, further comprising:

after performing steps up to the first determining step, a second data storing step of identifiably storing second data for each of first detection objects constituting the sets of the detection objects, the second data including labels given to the sets of the detection objects and a determination result to an effect that the sets of the detection objects are the groups of the road signs for at least the sets of the detection objects determined to be the groups of the road signs by the first determining step;

a third detecting step of further performing steps up to the first detecting step;

a retrieving step of retrieving the second data for detection objects detected by the third detecting step;

a fourth labeling step of giving the same labels to the first detection objects detected by the third detecting step in a case where a predetermined number or more of the first detection objects are detected by the third detecting step based on a retrieving result by the retrieving step, and of further giving the same labels as those of the first detection objects to other detection objects in a case where the other objects exist within a second predetermined distance longer than the first predetermined distance from any of the first detection objects detected by the third detecting step; and a second determining step of determining the other detection objects to be the road signs.

4. A method for determining an object type of a reflective object on a track, comprising:

a reflective point detecting step of detecting a plurality of reflective points in front of one's vehicle in a traveling direction, including scanning ahead of one's vehicle in a traveling direction by a predetermined detection wave output device, detecting reflective points reflecting detection waves outputted by the detection wave output device, and measuring relative positions of the reflective points with respect to one's vehicle;

a first detecting step of grouping the plurality of reflective points detected in the reflective point detecting step by a predetermined standard and regarding the grouped reflective points as detection objects, including detecting the detection objects by determining reflective points detected at relative positions proximal to one another among the reflective points to be points on the same detection object;

a relative speed measuring step of measuring relative speeds of the detection objects detected by the first detecting step with respect to one's vehicle;

a size measuring step of measuring sizes of the detection objects detected by the first detecting step;

a first labeling step of giving the same labels to detection objects existing within a first predetermined distance among the detection objects; and a first determining step of determining types of the detection objects based on the relative speeds detected in the relative speed measuring step, and determining a set of the detection objects being given the same labels in the first labeling step to be any of a group of objects belonging to the same object and a group of the same type of objects, wherein in the first determining step, the set of the detection objects is determined to be a group of objects belonging to the same vehicle in a case where detection objects larger than a predetermined size are included in the set of the detection objects which are given the same labels by the first labeling step, wherein the size measuring step is performed prior to the first labeling step, and wherein in the first labeling step, a second detection object, which is larger than a predetermined size, is detected by the first detecting step, and further, the same label as those of the second detection objects is given to the third detection object in a case where the third detection object is detected within a range located deeper comparing the second detection object seeing the traveling direction of the detection wave from the detection wave output device and within a third predetermined distance longer than the first predetermined distance from the second detection object, and further, the same label as those of the second detection objects is given to a fourth detection object in a case where the fourth detection object exists within the third predetermined distance from any of the second detection object and the third detection object.

5. The method for determining an object type according to claim 4, wherein steps up to the first labeling step are performed a certain number of times in the first determining step, and the second detection object and a detection object being given the same label as that of the second detection object are determined to be a group of objects belonging to the same large-sized vehicle in the first determining step in a case where a detection object being same as the second detection object and the third detection object is detected in each time of the step.

6. A method for determining an object type of a reflective object on a track, comprising:

a reflective point detecting step of detecting a plurality of reflective points in front of one's vehicle in a traveling direction;

a first detecting step of grouping the plurality of reflective points detected in the reflective point detecting step by a predetermined standard and regarding the grouped reflective points as detection objects, including grouping in time series groups of reflective points existing proximally to one another among the reflective points detected by the reflective point detecting step;

a relative speed measuring step of measuring relative speeds of the detection objects detected by the first detecting step with respect to one's vehicle, including regarding the grouped groups of the reflective points as the detection objects, and obtaining relative speeds of one's vehicle with respect to the detection objects based on time-serial distance data between the detection objects and one's vehicle;

a first determining step of determining types of the detection objects based on the relative speeds detected in the relative speed measuring step;

a third determining step of determining whether or not the detection objects detected by the first detecting step have a possibility of being road relating structural objects based on sizes thereof obtained from types determined for the detection objects and a grouping result in the past;

a fourth determining step of determining a degree at which the reflective points relating to the detection objects determined to have the possibility of being the road relating structural objects are crowded in a depth direction with respect to one's vehicle in the third determining step;

a first setting step of setting a region for the detection objects determined to have high crowdedness in the fourth determining step;

a fifth determining step of determining that the detection objects corresponding to the region where the crowdedness of the detection objects is high in the first setting step are the road relating structural objects irrespective of relative speeds thereof; and a sixth determining step of determining types of detection objects other than the detection objects determined to be the road relating structural objects in the fifth determining step based on relative speeds and positions of the detection objects and types thereof detected in the past.

7. The method for determining an object type according to claim 6, further comprising:

a first storing step of storing the types of the detection objects detected by the first determining step and the fifth determining step;

a second setting step of extracting only data of the detection objects determined to be the road relating structural objects from data stored in the first storing step, and of resetting the region for the detection objects high in crowdedness by use of the extracted data; and a second storing step of storing the region set in the second setting step, wherein the second setting step sets the region where the crowdedness of the objects is high by superposing a region where the crowdedness of the objects is high, which is set by the first setting step this time, and a region where the crowdedness of the objects was high, which was set by setting processing the previous time.

8. The method for determining an object type according to claim 7, wherein the second setting step includes setting the region where the crowdedness of the objects is high after adding the detection objects determined to be the road relating structural objects in the region where the crowdedness thereof is high in the previous processing to a grouping result obtained this time.

9. The method for determining an object type according to claim 7, wherein the second setting step includes determining that a detection object determined to be a running object in a region other than the region where the crowdedness of the objects was high by the past determination processing for an object type is determined to be the running object, even if the detection object is detected in the region where the crowdedness of the objects is high by a determination for an object type this time.

10. The method for determining an object type according to claim 7, further comprising:

a selecting step of obtaining a shape of a running lane in front of one's running vehicle, of extracting only detection object having widths equal to/less than a predetermined width and existing outside of the running lane from detection objects existing in a region determined to have road relating structural objects in the first setting step, and of selecting the detection objects having the width equal to/less than the predetermined width as the same road relating structural objects belonging to the region;

an operating step of operating to calculate distances from the detection objects to the running lane and of obtaining a center of gravities of the operated distances in a case where the number of the detection objects selected in the selecting step is equal to/more than a predetermined number; and a third setting step of setting the region after the object determination in the second setting step at a position moved from the running lane to an outside thereof by a distance to the center of gravities, the center being obtained in the operating step.

11. The method for determining an object type according to claim 10, further comprising:

a seventh determining step of determining a group of detection objects to be an array of reflective plates provided along a road and of determining a line connecting points where the reflective plates provided along a road are detected to one another to be a shape of a road in front of one's vehicle in a case where crowdedness of the detection objects in the region set in the third setting step is larger than a predetermined value when the region is set along a shape of the running lane.

* * * * *